United States Patent
Yousefpor et al.

(10) Patent No.: US 8,692,776 B2
(45) Date of Patent: Apr. 8, 2014

(54) CORRECTION OF PARASITIC CAPACITANCE EFFECT IN TOUCH SENSOR PANELS

(75) Inventors: Marduke Yousefpor, San Jose, CA (US); Sean O'Connor, Palo Alto, CA (US); Wayne Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1137 days.

(21) Appl. No.: 12/234,520

(22) Filed: Sep. 19, 2008

(65) Prior Publication Data

US 2010/0073301 A1   Mar. 25, 2010

(51) Int. Cl.
G06F 3/041   (2006.01)

(52) U.S. Cl.
USPC .......................................................... 345/173

(58) Field of Classification Search
USPC .......................................................... 345/178
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Sealy et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,711,598 B1 * | 3/2004 | Pare et al. | 708/300 |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2005/0147895 A1 * | 7/2005 | Chang et al. | 430/5 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2007/0074913 A1 * | 4/2007 | Geaghan et al. | 178/18.06 |
| 2008/0007529 A1 * | 1/2008 | Paun et al. | 345/168 |
| 2008/0309629 A1 | 12/2008 | Westerman et al. | |

(Continued)

FOREIGN PATENT DOCUMENTS

| JP | 2000-163031 A | 6/2000 |
|---|---|---|
| JP | 2002-342033 A | 11/2002 |

OTHER PUBLICATIONS

Westerman, Wayne Carl, et al; U.S. Appl. No. 11/818,475, "Bottom Up Watershed Dataflow Method and Region Specific Segment Based on Historic Data," filed Jun. 13, 2007.

(Continued)

Primary Examiner — Quan-Zhen Wang
Assistant Examiner — Nelson D Runkle, III
(74) Attorney, Agent, or Firm — Morrison & Foerster LLP

(57) ABSTRACT

Embodiments of the invention relate to correction of erroneous touch data on a touch sensor panel. Erroneous touch data may occur when a user is touching locations on the touch sensor panel but fails to be in good contact with another part of the device including the touch sensor panel. These erroneous readings may be statistically compensated for. A capacitance value that combines various external capacitances that may cause erroneous results can be calculated. Then, if necessary, received touch data can be modified to take into account the external capacitance. Accordingly, improved accuracy is provided for determining touch event(s) on a touch sensor panel.

32 Claims, 13 Drawing Sheets

(56) References Cited

U.S. PATENT DOCUMENTS

| | | |
|---|---|---|
| 2009/0160787 A1 | 6/2009 | Westerman et al. |
| 2009/0284495 A1* | 11/2009 | Geaghan et al. ............. 345/174 |
| 2010/0060608 A1 | 3/2010 | Yousefpor |

OTHER PUBLICATIONS

Westerman, Wayne Carl, et al.; U.S. Appl. No. 11/963,578, "Negative Pixel Compensation," filed Dec. 21, 2007.

Yousefpor, Marduke, U.S. Appl. No. 12/208,324, "Correction of Parasitic Capacitance Effect in Touch Sensor Panels," filed Sep. 10, 2008.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

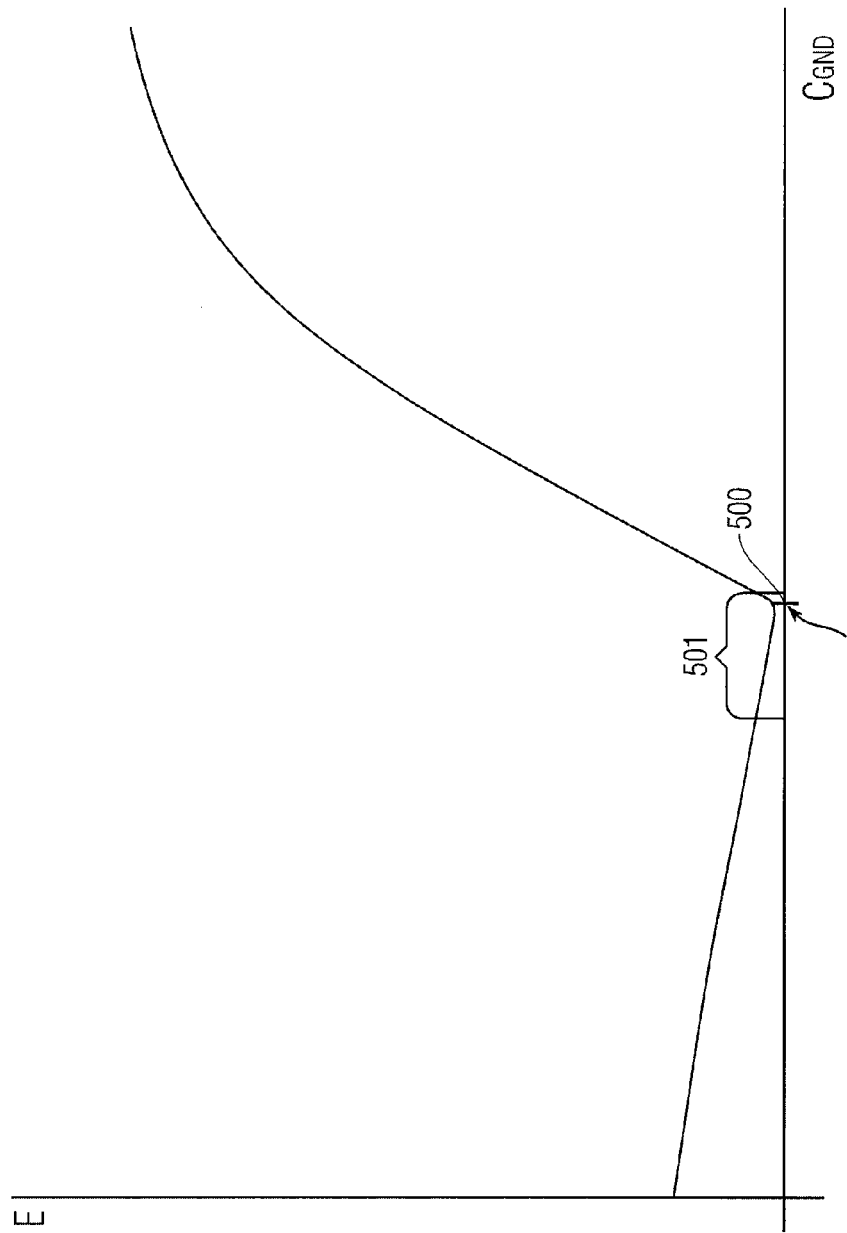

CORRECTION OF PARASITIC CAPACITANCE EFFECT IN TOUCH SENSOR PANELS

FIELD OF THE INVENTION

This relates generally to multi-touch sensor panels that utilize an array of capacitive sensors (pixels) to detect and localize touch events, and more particularly, to the correction of pixels having distorted readings when touch events are generated by a poorly grounded object.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can, in some embodiments, be formed from a matrix of drive lines (e.g., row traces) separated by a dielectric material from a plurality of sense lines (e.g., column traces), with sensors or pixels created at each crossing point of the drive and sense lines. Touch sensor panels can alternatively be arranged in any number of orientations or dimensions, including, but not limited to, diagonal, concentric circles, spiral, three-dimensional, or random orientations. In order to detect and identify the location of a touch on a touch sensor panel, stimulation signals are provided to the drive lines causing the sense lines to generate signals indicative of touch output values. By knowing the timing of the stimulation signals to specific drive lines relative to the signals read out of the sense lines, processor(s) can be used to determine where on the touch sensor panel a touch occurred.

More specifically, the capacitance between various drive and sense lines can be measured and calculated. A touch event can result in a decreased capacitance between these lines. The processor can detect such decreases to determine when and where touch events occur.

When the object touching the touch sensor panel is poorly grounded, touch output values read out of the sense lines may be erroneous, or otherwise distorted. More specifically, various external capacitances, such as the capacitance between the device and ground, or the capacitance between the touch object (i.e., a user's finger) and ground can distort the measurements of the capacitances between various drive and sense lines. The possibility of such erroneous or distorted readings is further increased when two or more simultaneous touch events occur on the touch sensor panel.

SUMMARY OF THE INVENTION

Embodiments of the invention relate to correction of erroneous touch data on a touch sensor panel. Erroneous touch data (e.g., so-called "negative pixels") may occur when a user is touching one or more locations on the touch sensor panel but fails to be in good contact with another part of the device including the touch sensor panel. These erroneous readings may be statistically compensated for. A capacitance value that combines various external capacitances that may cause erroneous results can be calculated. Then, if necessary, received touch data can be modified to take into account the external capacitance. Accordingly, improved accuracy is provided for determining touch event(s) on a touch sensor panel. Also, different embodiments discussed herein can provide for different tradeoffs of precision and computational cost by relying more on estimation for devices that may have lower computational capabilities. Also discussed are schemes for mediating any negative effects of high reliance on estimation.

BRIEF DESCRIPTION OF THE DRAWINGS

FIG. 5 is a graph illustrating the relationship between various $C_{GND}$ values and their respective error values according to some embodiment of the invention.

DETAILED DESCRIPTION OF THE PREFERRED EMBODIMENTS

Figure 1:
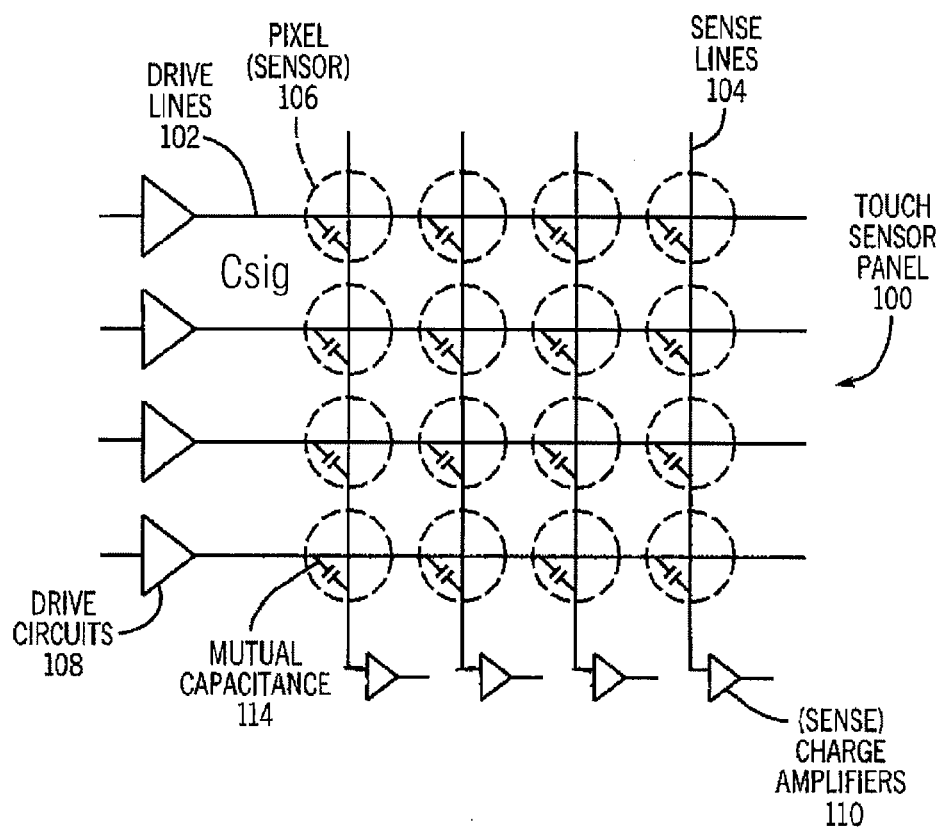
FIG. 1 illustrates an exemplary touch sensor panel in accordance with embodiments of the invention.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the invention relate to correction of erroneous touch data on a touch sensor panel. Erroneous touch data (e.g., so-called "negative pixels") may occur when a user is touching one or more locations on the touch sensor panel but fails to also be in good contact with another part of the device including the touch sensor panel. These erroneous readings may be statistically compensated for. A capacitance value that combines various external capacitances that may cause erroneous results can be calculated. Then, if necessary, received touch data can be modified to take into account the external capacitance. Accordingly, improved accuracy is provided for determining touch event(s) on a touch sensor panel. Furthermore, embodiments of the present invention need not require the use of additional hardware at the device to measure external capacitances, as these are calculated/estimated computationally based on preloaded data. Also, different embodiments discussed herein can provide for different tradeoffs of precision and computational cost by relying more on estimation for devices that may have lower computational capabilities. Also discussed are schemes for mediating any negative effects of high reliance on estimation.

Although embodiments of the invention may be described and illustrated herein in terms of mutual capacitance touch sensor panels, it should be understood that embodiments of this invention are not so limited, but are additionally applicable to self-capacitance sensor panels, and any capacitance based touch or proximity sensor panels in which detection errors occur due to stray or parasitic capacitance. The touch sensor panel may be implemented with a display, trackpad, trackball, or a variety of other touch sensing surfaces where determination of location and/or intensity of touch would be relevant.

U.S. patent application Ser. No. 11/963,578, filed on Dec. 21, 2007, entitled "NEGATIVE PIXEL COMPENSATION", and incorporated herein by reference in its entirety for all purposes discusses some types of negative pixel compensation. U.S. patent application Ser. No. 12/208,324, filed on Sep. 10, 2008, entitled "CORRECTION OF PARASITIC CAPACITANCE EFFECT IN TOUCH SENSOR PANELS" and incorporated by reference herein in its entirety for all purposes also discusses negative pixel compensation. The latter application uses additional electronic elements to obtain an external capacitance value for the negative pixel compensation computations. Embodiments of the present invention need not use such elements and may compute the ground capacitance values based on ordinary touch data (and, in some cases, pre-stored statistical data).

FIG. 1 illustrates an exemplary touch sensor panel 100 according to embodiments of the invention. Touch sensor panel 100 includes an array of pixels 106 that can be formed, in some embodiments, by a two-layer electrode structure separated by a dielectric material. One layer of electrodes comprises a plurality of drive lines 102 positioned perpendicular to another layer of electrodes comprising a plurality of sense lines 104. The pixels 106 (also referred to as sensors) can be formed at the crossing points of the drive lines 102 and sense lines 104, with each of the pixels 106 having an associated mutual capacitance 114 (also referred to as coupling capacitance). In other embodiments, the array of pixels can be formed from drive and sense lines on the same layer, where the drive and sense lines are adjacent to or nearby each other.

Drive lines 102 (also referred to as rows, row traces, or row electrodes) can be activated by stimulation signals provided by respective drive circuits 108. Each of the drive circuits 108 includes an alternating current (AC) voltage source referred to as a stimulation signal source. The stimulation signals from the drive circuits 108 may also be referred to as forward driving signals or forward stimulation signals. The sense amplifiers 110 may also be referred to as charge amplifiers or trans-conductance amplifiers.

In some embodiments, to sense touch event(s) on the touch sensor panel 100, each of the drive lines 102 can be sequentially stimulated by the drive circuits 108, and the sense amplifiers 110 detect the resulting voltage values from the sense lines 104. In other embodiments, more than one drive line can be stimulated at a time by one or more frequencies and phases of stimulation signals. The detected voltage values are representative of pixel touch output values, indicating the pixel location(s) where the touch event(s) occurred and the amount of touch that occurred at those location(s).

Figure 2:
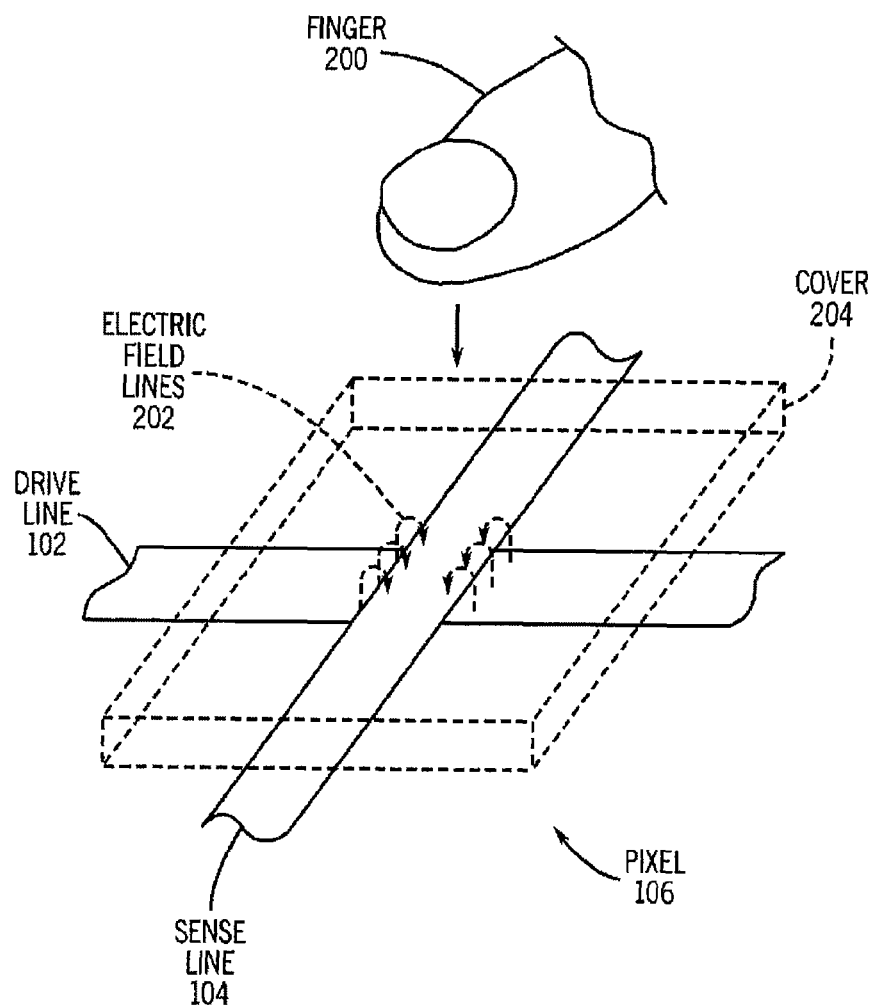
FIG. 2 illustrates a close-up of a single exemplary pixel of the touch sensor panel with an impending touch event by a finger in accordance with embodiments of the invention.

FIG. 2 illustrates a close-up of a single exemplary two-layer pixel 106 with an impending touch event by a finger 200. When the pixel 106 is not touched by an object, an electric field (shown as fringing electric field lines 202) can be formed between the drive line 102 and the sense line 104 via a dielectric material. Some of the electric field lines 202 can extend above the drive and sense lines 102, 104 and even above a cover 204 located over the touch sensor panel 100. When an object, such as the finger 200, touches the pixel 106 (or a location near the pixel 106), the object blocks some of the electric field lines 202 extending above the cover 204. Such blockage or interruption of the electronic field lines 202 changes the capacitance associated with the pixel 106, which changes the current flow from the drive line 102 to the sense line 104 (current is proportional to capacitance), and which in turn changes the voltage value (or charge coupling) detected at the sense line 104.

Alternative embodiments may use alternative touch sensor configurations. For example, some embodiments may provide for a single layer touch sensor configurations in which drive lines and sense lines may run in parallel or otherwise in proximity to each in a single layer.

Figure 3:
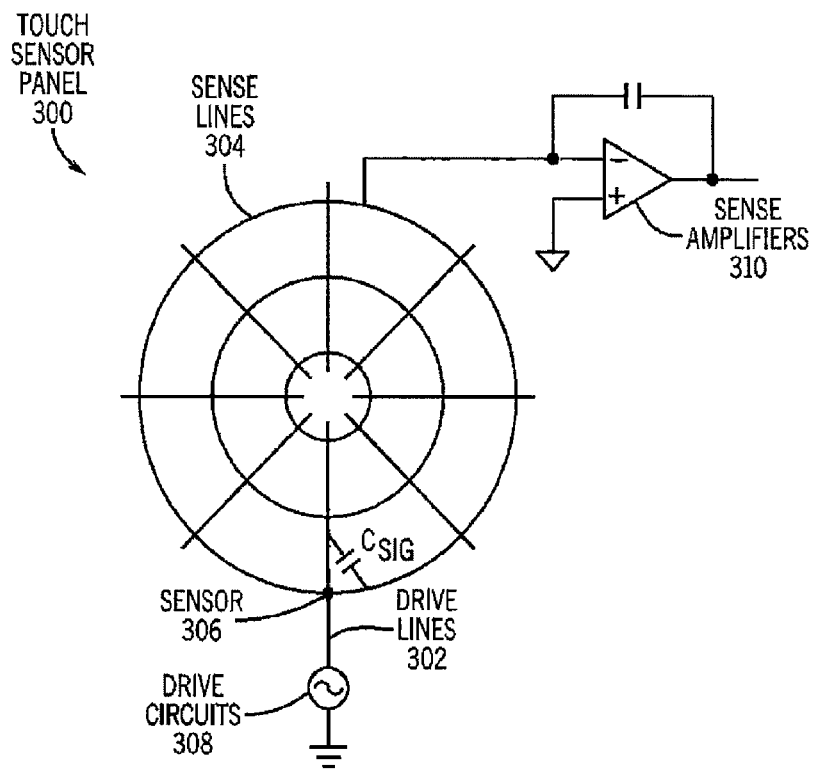
FIG. 3 illustrates an alternative embodiment of the touch sensor panel in accordance with embodiments of the invention.

The touch sensor panel 100 illustrated in FIG. 1 is arranged according to a Cartesian coordinate system. In alternate embodiments, the touch sensor panel 100 may be arranged in any number of orientations or dimensions, including, but not limited to, diagonal, concentric circles, spiral, three-dimensional, or random orientations. For example, FIG. 3 illustrates a touch sensor panel 300 arranged according to a polar coordinate system. The touch sensor panel 300 comprises a plurality of radially extending drive lines 302 and a plurality of concentrically arranged sense lines 304. At the crossing points of the drive lines 302 and sense lines 304 can be formed pixels 306 having an associated mutual capacitance $C_{SIG}$. The drive lines 302 are driven by driving circuits 308. The sense lines 304 are detected by sense amplifiers 310.

When a touch event occurs on the touch sensor panel 100, capacitive coupling other than that described above may occur. These other capacitive couplings can be of a magnitude significant enough to be undesirable and can lead to erroneous, false, or otherwise distorted pixel touch output values. Parasitic capacitance can be introduced when the object touching the touch sensor panel 100 is poorly grounded. For purposes of this application, "poorly grounded" may be used interchangeably with "ungrounded," "not grounded," "not well grounded," "isolated," or "floating" and includes poor grounding conditions that exist when the object is not making a low resistance electrical connection to the ground of the device employing the touch sensor panel. As an example, if the device employing the touch sensor panel 100 is placed on a table and the object only touches the device on the touch sensor panel 100, then a poor grounding condition may exist for that touch event. Conversely, if the object touches the touch sensor panel 100 and another part of the device (e.g., the object is holding the device and is in contact with the back of the device), then a good grounding condition exists and the impact of parasitic capacitance is negligible.

The presence of parasitic capacitance under poor grounding conditions can distort pixel touch output values in at least two ways. First, the change in the pixel touch output value measured for the touched pixel 106 can be less than it actually should be. Thus, the device employing the touch sensor panel 100 erroneously believes a lesser degree of touch occurred at the pixel 106 than in actuality. Second, when more than one simultaneous touch event is caused by the same poorly grounded object, pixel(s) 106 that were not actually touched may register having received a negative amount of touch (a "negative pixel" at a phantom location). Sensing negative pixels at phantom locations may be problematic when the touch sensor panel 100 is operable to capture inputs, for example, for a graphical user interface (GUI). Negative pixels are described in U.S. patent application Ser. No. 11/963,578 filed on Dec. 21, 2007 and entitled "Negative Pixel Compensation," the contents of which are incorporated by reference herein in its entirety.

Figure 4A:
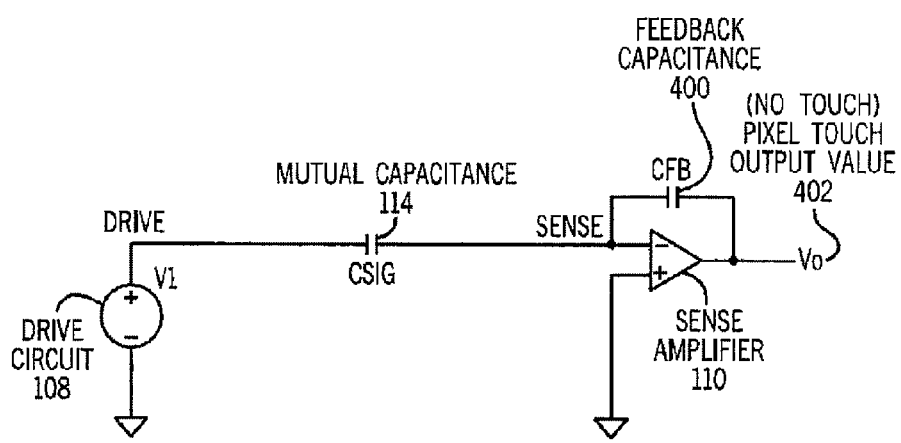
FIGS. 4A-4D illustrate exemplary conceptually equivalent electrical circuits corresponding to a single pixel of the touch sensor panel under different touch and grounding conditions in accordance with embodiments of the invention.

FIGS. 4A-4D illustrate exemplary conceptually equivalent electrical circuits corresponding to a single pixel 106 under different touch and grounding conditions. The circuit illustrated in FIG. 4A is representative of a no touch scenario. The drive circuit 108 applies a stimulation signal $V_I$ to the drive line 102 (see FIG. 1). The stimulation signal can comprise an AC voltage signal having a variety of amplitudes, frequencies, and/or waveform shapes. For example, the stimulation signal may comprise a sinusoidal 18 Vpp signal. With no object interrupting the electric field lines, the characteristic mutual capacitance 114 comprises the charge coupling detected at the sense amplifier 10. In FIG. 4A, the mutual capacitance 114 is denoted as $C_{SIG}$ and a feedback capacitance 400 is denoted as $C_{FB}$. The resulting (no touch) pixel touch output value 402 ($V_o$) at the output of the sense amplifier 110 can be expressed as:

$$V_o = V_I \times C_{SIG}/C_{FB} \quad (1)$$

Figure 4B:
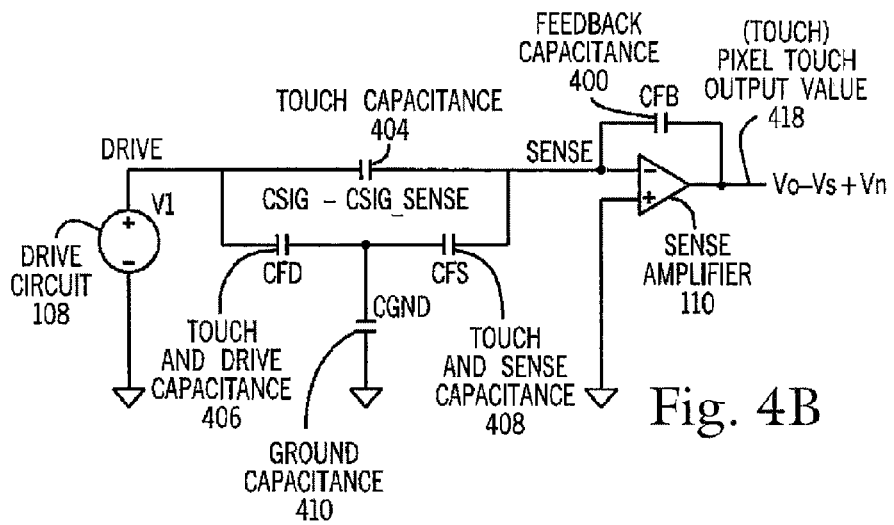

The circuit illustrated in FIG. 4B is representative of an object, such as the finger 200, touching the pixel 106 (or near the pixel 106). When a stimulation signal $V_I$ is applied to the drive line 102, similar to that discussed above for FIG. 4A, and with the object blocking some of the electric field lines between the drive line 102 and sense line 104, the characteristic mutual capacitance 114 is reduced and becomes a touch capacitance 404. The capacitance is reduced by $C_{SIG\_SENSE}$ and the touch capacitance 404 can be denoted as $C_{SIG} - C_{SIG\_SENSE}$. As an example, the mutual capacitance 114 (e.g., with no touch) may be approximately 0.75 pico-Farad (pF) and the touch capacitance 404 (e.g., with touch) may be approximately 0.25 pF.

Figure 4C:
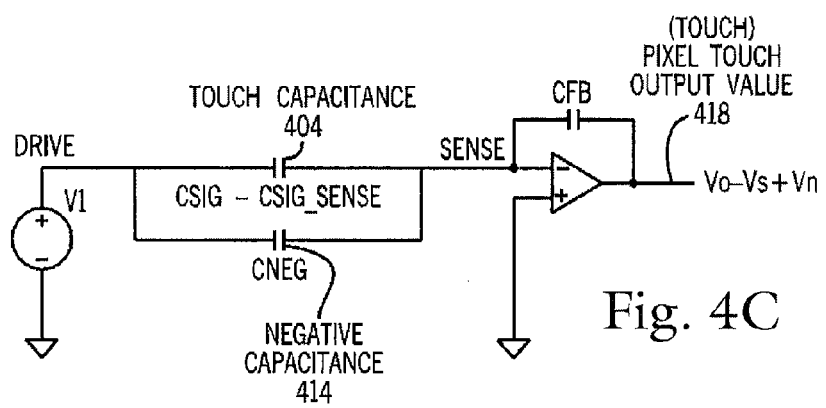

Introduction of touch not only changes the charge coupling at the pixel 106 from the mutual capacitance 114 to the touch capacitance 404, but undesirable capacitance couplings called parasitic capacitance can also be introduced. Parasitic capacitance comprises a touch and drive capacitance 406 ($C_{FD}$) in series with a touch and sense capacitance 408 ($C_{FS}$). Also shown in FIG. 4B is a ground capacitance 410 ($C_{GND}$) (also referred to as an object-to-ground capacitance) comprising inherent capacitance associated with the device and an inherent capacitance associated with the object. The circuit illustrated in FIG. 4C is equivalent to the circuit shown in FIG. 4B. In FIG. 4C, a negative capacitance 414 ($C_{NEG}$) is equivalent to the combination of the touch and drive capacitance 406, touch and sense capacitance 408, and ground capacitance 410 in FIG. 4B. The negative capacitance 414 can be expressed as:

$$C_{NEG} = C_{FD} \times C_{FS}/(C_{FD} + C_{FS} + C_{GND}) \quad (2)$$

Figure 4D:
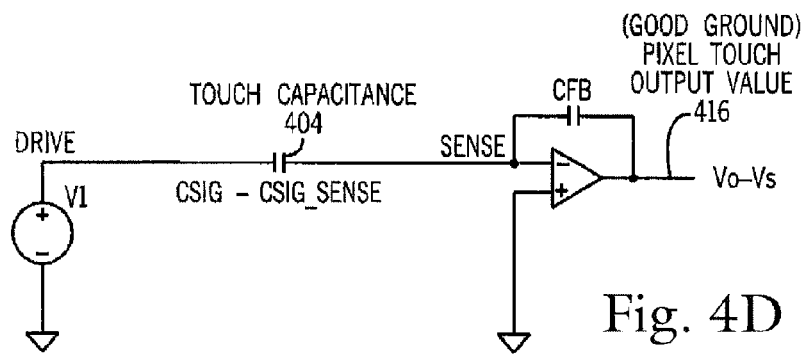

When the object touching the pixel 106 is well grounded because, for example, the object is also touching a bezel, backside, or other part of the device employing the touch sensor panel 100, the ground capacitance 410 is a large value relative to the touch and drive capacitance 406 and the touch and sense capacitance 408. (Ground capacitance 410 ($C_{GND}$) under good grounding conditions can be on the order of 100 pF.) The large value of the ground capacitance 410 results in the negative capacitance 414 being a negligible value (notice $C_{GND}$ in the denominator in Equation (2)). The touch and drive capacitance 406 has the effect of increasing the drive current of the drive circuit 108, while the touch and sense capacitance 408 has the effect of being shunted by the virtual ground of the sense amplifier 110. Thus, a circuit illustrated in FIG. 4D is representative of the object touching the pixel 106 under good grounding conditions. The resulting (good ground) pixel touch output value 416 (denoted as $V_o - V_s$) at the output of the sense amplifier 110 is proportionally smaller relative to the (no touch) pixel touch output value 402 and can be expressed as:

$$V_o - V_s = (V_I \times C_{SIG}/C_{FB}) - (V_I \times C_{SIG\_SENSE}/C_{FB}) \quad (3)$$

In contrast, when the object touching the pixel 106 is under poor grounding conditions, the negative capacitance 414 is no longer negligible. The touch and sense capacitance 408 is no longer shunted to ground. The ground capacitance 410 can be on the same order as the touch and drive capacitance 406 and touch and sense capacitance 408. (Ground capacitance 410 ($C_{GND}$) under poor grounding conditions can be on the order of 1 pF.) The negative capacitance 414 causes the voltage detected at the sense amplifier 110 to be higher by an amount $V_n$ than under good grounding conditions:

$$V_n = V_I \times C_{NEG}/C_{FB} \quad (4)$$

The (poor ground) pixel touch output value 418 can be expressed as $V_o - V_s + V_n$. The parasitic effect on the actual pixel touch output value is in the opposite direction of the intended touch capacitance change. Hence, a pixel experiencing touch under poor grounding conditions may detect less of a touch than is actually present.

Figure 4E:
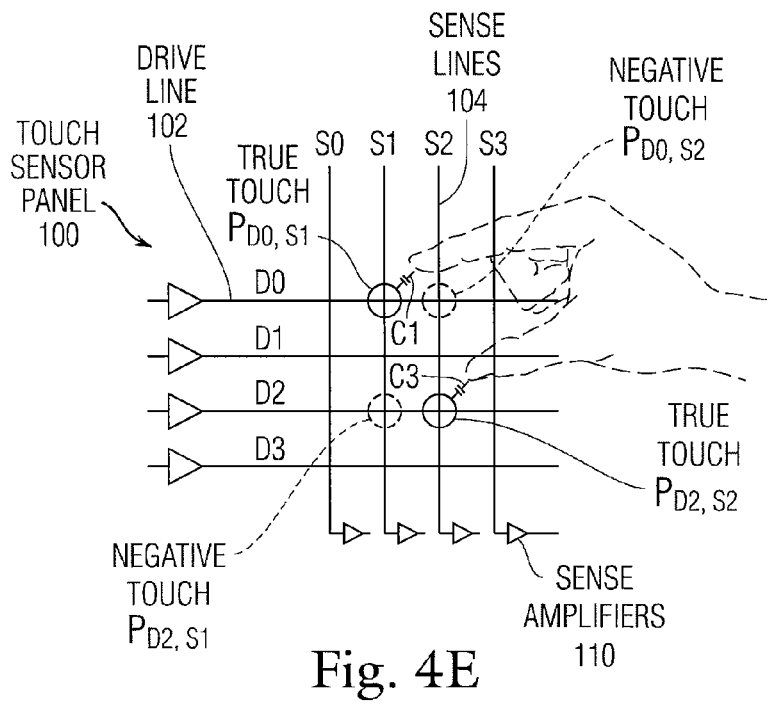
FIG. 4E illustrates a simultaneous multiple touch event occurring on the touch sensor panel in accordance with embodiments of the invention.

FIGS. 4E and G illustrate a simultaneous multiple touch event occurring on the touch sensor panel 100 in accordance with embodiments of the invention. Two fingers are touching two different spots on the touch sensor panel 100, at the pixel intersected by drive line D0 and sense line S1 ($P_{D0,S1}$) and at the pixel intersected by drive line D2 and sense line S2 ($P_{D2,S2}$). Under poor grounding conditions, there is parasitic capacitance at each of $P_{D0,S1}$ and $P_{D2,S2}$ as discussed above. In addition, negative pixels can be registered at the pixel (phantom location) intersected by drive line D0 and sense line S2 ($P_{D0,S2}$) and at the pixel (phantom location) intersected by drive line D2 and sense line S1 ($P_{D2,S1}$).

When drive line D0 is simulated, charge from $P_{D0,S1}$ is coupled on the finger touching over $P_{D0,S1}$. Instead of being shunted to ground, some charge is coupled back onto sense line S1 and also the user's other finger touching the touch sensor panel (e.g., onto sense line S2). If the user was properly grounded, the finger over $P_{D2,S2}$ would not cause charge to be coupled onto sense line S2 because drive line D2 would not be stimulated at the same time as drive line D0. The net effect is that with drive line D0 simulated, the sense amplifiers 110 senses a touch event at sense lines S1 and S2 (e.g., $P_{D0,S1}$ and $P_{D0,S2}$). Actual touch at $P_{D2,S2}$ similarly causes charge to be coupled to sense line S1 through the user's hand. Thus, when drive line D2 is stimulated, the sense amplifiers 110 senses a touch event at sense lines S1 and S2 (e.g., $P_{D2,S1}$ and $P_{D2,S2}$).

Unintended charge coupling back on sense lines S1 and S2 reduces the apparent touch detected at touch locations $P_{D0,S1}$ and $P_{D2,S2}$. The charge coupling across the user's fingers to other sense lines can also weaken adjacent pixels not being touched, to the point where output readings indicative of a negative amount of touch (a negative pixel) can be erroneously produced. Negative pixelation is made worse if there are multiple pixels being touched along the same drive line being stimulated, because then even more charge can be coupled onto other sense lines being simultaneously touched.

Figure 4F:
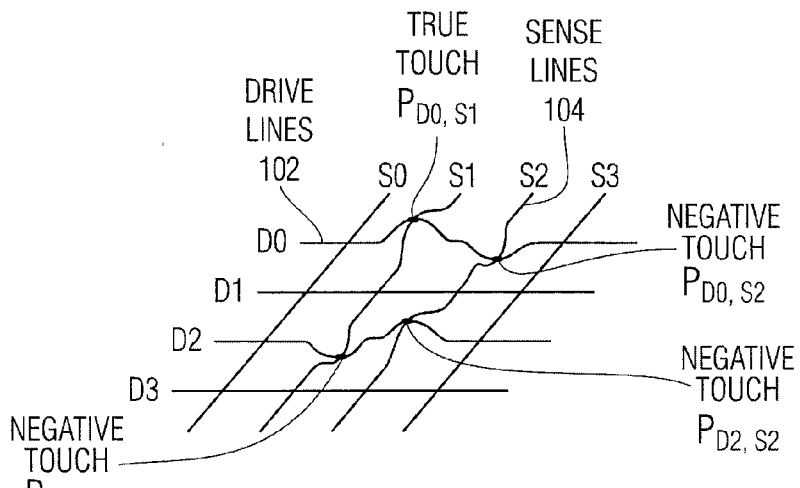
FIG. 4F illustrates an exemplary image map showing a three-dimensional view of the phenomenon of negative pixels corresponding to the simultaneous touch event illustrated in FIG. 4E.

FIG. 4F illustrates an exemplary image map showing a three-dimensional view of the phenomenon of negative pixels corresponding to the simultaneous touch event illustrated in FIG. 4E. In FIG. 4F, positive output values are associated with locations of true touch (e.g., $P_{D0,S1}$ and $P_{D2,S2}$) and negative output values are associated with locations of negative touch (e.g., $P_{D0,S2}$ and $P_{D2,S1}$).

The relationship between the measured and actual touch output values can be expressed as:

$$CSIG\_SENSE_{i,j,measured} = CSIG\_SENSE_{i,j,actual} - CNEG_{i,j} \quad (5)$$

For the case where it can be assumed that little interaction occurs to adjacent drive and sense lines, $CNEG_{m,j}$ in Equation (5) can be approximated as:

$$CNEG_{i,j} = A \frac{\sum\limits_{\substack{all\ touched \\ Sense\ n}} CSIG\_SENSE_{i,n} \times \sum\limits_{\substack{all\ touched \\ Drive\ m}} CSIG\_SENSE_{m,j}}{\sum\limits_{\substack{all\ touched \\ Pixels(r,s)}} CSIG\_SENSE_{r,s} + C_G} \quad (6)$$

where $A = (A_2 \times A_3)/(A_2 + A_3)$ and $C_G = C_{GND}/(A_2 + A_3)$. $A_2$ and $A_3$ are approximate constants for each particular touch sensor panel design. These constants may be obtained through simulation and/or empirical measurements for a given panel sensing pattern design; measured, for example, during efforts to design the touch sensor panel. Once obtained these constants can be stored in each device featuring the touch panel.

Rewriting Equations (5) and (6) into matrix form, Equation (7) is a form of generalized Sylvester equation where closed form solutions are known only for a special case where C is symmetric (e.g., $C = C^T$):

$$C' = C - A\frac{CQC}{v^T Cu + C_G} \quad (7)$$

where $$C' = \begin{bmatrix} \cdots & \cdots & \cdots \\ \vdots & CSIG\_SENSE_{m,j\,measured} & \vdots \\ \cdots & \cdots & \cdots \end{bmatrix},$$

$$C = \begin{bmatrix} \cdots & \cdots & \cdots \\ \vdots & CSIG\_SENSE_{m,j\,actual} & \vdots \\ \cdots & \cdots & \cdots \end{bmatrix},$$

$$Q = \begin{bmatrix} 1 & \cdots & 1 \\ \vdots & 1 & \vdots \\ 1 & \cdots & 1 \end{bmatrix},$$

$$u = \begin{bmatrix} 1 \\ \vdots \\ 1 \end{bmatrix}, \text{ and}$$

$$v = \begin{bmatrix} 1 \\ \vdots \\ 1 \end{bmatrix}.$$

Since C is unlikely to be symmetric for an arbitrary touch profile, exact solution to Equation (7) is not possible. However, an iterative approach can be used to approximate or estimate C:

$$\text{matrix of } CSIG\_SENSE_{actual} = C_{k+1} = C' + A\frac{C_k Q C_k}{v^T C_k u + C_G} \quad (8)$$

where $k = 1, 2, 3, \ldots$ and $C_1$ = matrix of $CSIG\_SENSE_{measured}$: $CSIG\_SENSE_{i,j,measured} > 0$ chosen as positive pixels only to accelerate convergence.

The stop criterion for determining convergence can be expressed as follows:

$$\|C_{k+1} - C_k\|_2 < a\|C_k - C_{k-1}\|_2 \text{ where } a << 1 \quad (9)$$

Embodiments of the invention provide for repeatedly calculating Equation (8) for increasing values of k until the criterion of convergence defined by Equation (9) is reached. The degree of required convergence can be specified to meet system requirements, such as processor capability, the rate at which touch event(s) are sensed, and/or touch image quality requirements.

However, Equation (9) can only be calculated if the value of the ground capacitance $C_{GND}$ is known. $C_{GND}$ can be further expressed as the parallel sum of the capacitance between the object or body that is touching the panel and the ground ($C_{BODY}$) and the capacitance between the chassis of the device and ground ($C_{CHASSI}$). Thus $$C_{GND} = C_{BODY} \| C_{CHASSI} = C_{BODY} + C_{CHASSI} \quad (10)$$

The value of $C_{GND}$ can be obtained by performing measurements using dedicated hardware in the portable device. Such a system is described in the U.S. patent application Ser. No. 12/208,324, entitled "CORRECTION OF PARASITIC CAPACITANCE EFFECT IN TOUCH SENSOR PANELS", mentioned above.

However, additional hardware for the purposes of parasitic capacitance compensation may be relatively costly and/or may increase the chances of failure of a device. Therefore, it may be beneficial for some types of devices that compensation for parasitic capacitance is performed only computationally, without additional hardware.

Embodiments of the present invention can provide for compensating for parasitic capacitance without using additional sensors. Thus, this compensation can be performed entirely computationally. In order to achieve that, the value $C_{GND}$ may need to be obtained computationally.

According to some embodiments, a predefined initial value for $C_{GND}$ can be provided. The initial value can be stored in the device at time of fabrication, software installation or software update. The value can be specified by the producer or designer of the device and can be calculated and/or derived through experimentation to provide a relatively good guess as to the expected $C_{GND}$ capacitance. For example, the factory may measure the various capacitances for several expected usage scenarios and calculate the initial $C_{GND}$ based on these measurements. The different usage scenarios may include different device positions, different users, different clothing or shoes worn by the users, different types of support for the device, etc.

The initial value for $C_{GND}$ can be plugged in the above iteration equation, and the equation can be iterated to obtain a resulting matrix $C_1$ which may represent a first guess of the actual capacitances of the touch pixels of the touch panel. However, this guess may not be accurate as it is calculated based on an initial value of $C_{GND}$ which is itself an educated guess.

Next, the accuracy of matrix $C_1$ can be measured. Since it can be known that the structure of the touch panel does not actually include any negative capacitances at the touch pixel (this can be known by ensuring there are no inductors at the touch pixels), then any negative capacitance in the matrix $C_1$ can be safely assumed to be an error. Furthermore, a total error value of the matrix $C_1$ can be measured by adding all negative capacitances. Suppose the set $N_{1 \ldots n}$ includes all negative capacitances within the matrix $C_1$. Thus, for each $N_k$ (k=1 ... n):

$$N_k = C_{1:i,j} \text{ such that } C_{1:i,j} < 0, \quad (11)$$

where $C_{1:i,j}$ is the value associated with coordinates i and j of matrix $C_1$ and n is the total number of negative values within the $C_1$ matrix. If there are no negative values, then n=0 and the set N is empty. A total error E for the matrix $C_1$ may be found by adding all the negative capacitances $N_k$ or their squares:

$$E = \Sigma N_k^2 \quad (12)$$

This is unlikely to provide an exact value for the total error (because some positive capacitances within the $C_1$ matrix can also be erroneous). However, this can provide a usable and relatively consistent measure of error.

Once obtained, the error can be checked against a predefined error threshold value. The error threshold value can indicate an acceptable level of error for the stray capacitance measurement step. If the error is above a predefined threshold value, another value of $C_{GND}$ can be selected and another capacitance matrix $C_2$ based on this other value can be calculated. The error for the $C_2$ matrix can also be calculated and to determine whether the second ground value is suitable. Thus, multiple $C_{GND}$ values can be selected and tested until a suitable $C_{GND}$ is found.

Some embodiments provide for various strategies for selecting the various $C_{GND}$ values to ensure that an optimal value is found. For example, experimental data has been used to determine that for a given device the relationship between various $C_{GND}$ values and their respective E (error) values may generally follow a curve. An example of such a curve for a device of some embodiments of the invention is shown in FIG. 5. It has also been experimentally discovered that for a given device (or at least the tested devices), environmental conditions (such as chassis and body capacitances $C_{CHASSIS}$ and $C_{BODY}$) may not affect the overall shape of the curve, but may instead result in shifting the curve to the left or to the right.

The $C_{GND}$ value associated with the lowest error value can be optimal $C_{GND}$ value 500. Range 501 can be the range within the predefined error threshold, for which a calculated $C_{GND}$ would be considered acceptable.

The curve of FIG. 5 (or a similar curve that has been experimentally determined to be valid for a different type of device) can be electronically stored in embodiments of the invention. This can be done at time of manufacture or software installation or update. Embodiments of the invention may assume that the general relationship between $C_{GND}$ and E will be according to this stored curve. However, embodiments may not be aware of the position of the curve along the x-axis as this depends on the current environment (i.e., the current $C_{CHASSIS}$ and $C_{BODY}$ values). Thus, when embodiments guess a value of $C_{GND}$ and calculate a respective value for E, they can fit these values to the previously stored curve. This may allow the embodiments to determine the precise position of the curve in the x axis, which may allow them to guess new $C_{GND}$ values that are very close to or the same as the optimal $C_{GND}$ value 500. Therefore, an acceptable $C_{GND}$ value may be found by using relatively few iterations of the process of guessing a $C_{GND}$ value and calculating its associated error value E.

Figure 6:
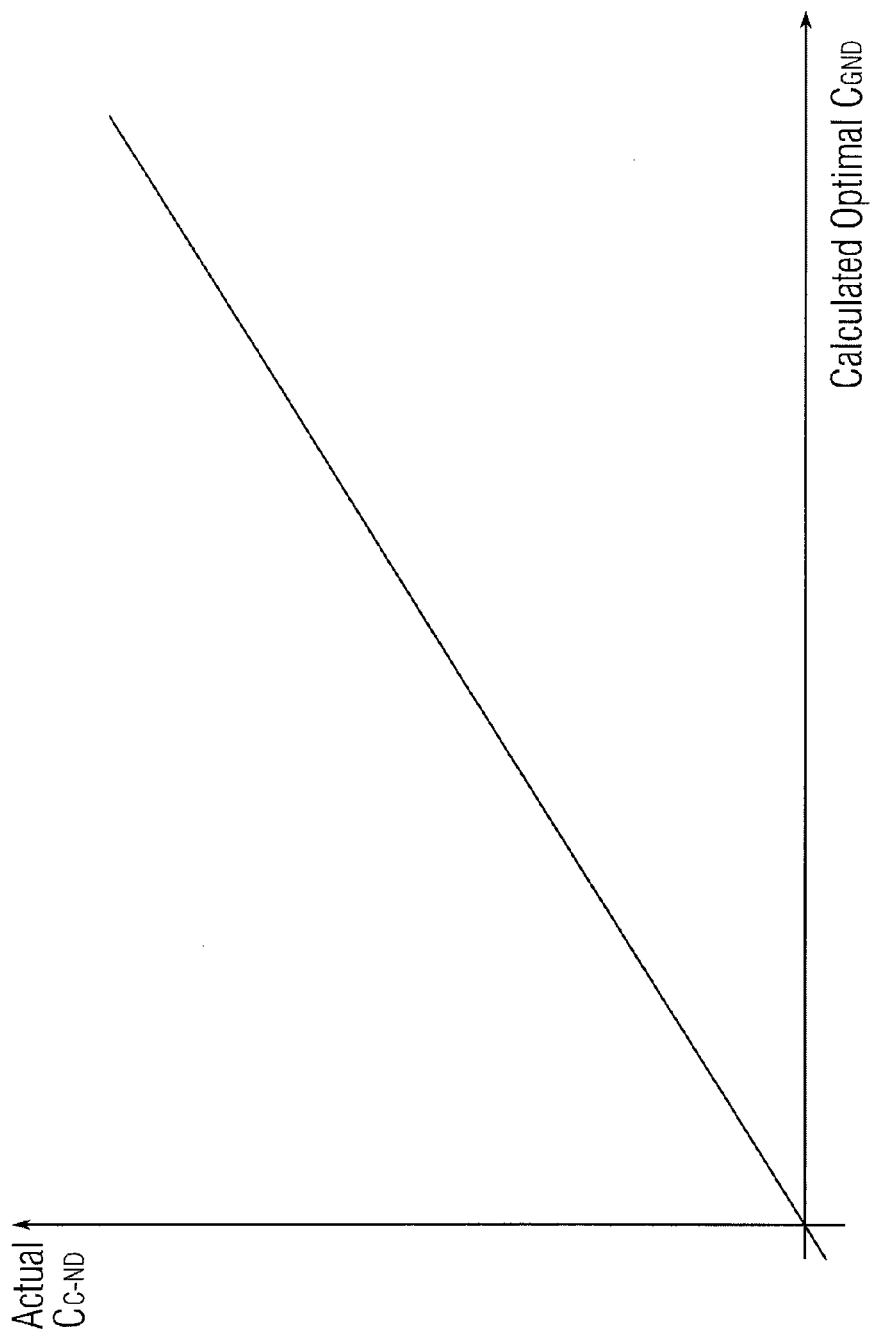
FIG. 6 is a graph illustrating the relationship between various calculated optimal $C_{GND}$ values and respective actual $C_{GND}$ values according to some embodiments of the invention.

FIG. 6 shows another curve that may be used in accordance with embodiments of the invention. It is a curve showing a relationship between a calculated $C_{GND}$ value and a compensated $C_{GND}$ value. The process of calculation of error values based on suggested $C_{GND}$ values discussed above is not perfect. One reason for imperfection may be, as discussed above, that the process only takes negative capacitance values in the matrix C as errors, and does not detect errors in variations of positive capacitance values. Thus, the optimal $C_{GND}$ value obtained according to the process discussed above need not necessarily be the optimal value in practice.

However, it has been experimentally discovered that at least for some embodiments there may be a generally predictable relationship between the calculated optimal $C_{GND}$ value and the actual optimal $C_{GND}$ value. This relationship can be expressed as a graph like the one of FIG. 6. The x-axis may represent the calculated optimal $C_{GND}$ value and the y-axis the corresponding actual $C_{GND}$ value. The graph can differ for different devices. And while the graph can be linear it need not necessarily be linear. For some embodiments, the graph of FIG. 6 can be discovered for specific types of devices through experimentation and stored in the devices. If the graph is linear, or if it fits another type of easy to calculate function, it can be stored by storing the corresponding function. When a device obtains a calculated optimal $C_{GND}$ value it can use the previously stored graph of FIG. 6 to convert that value to an actual $C_{GND}$ value.

Figure 7:
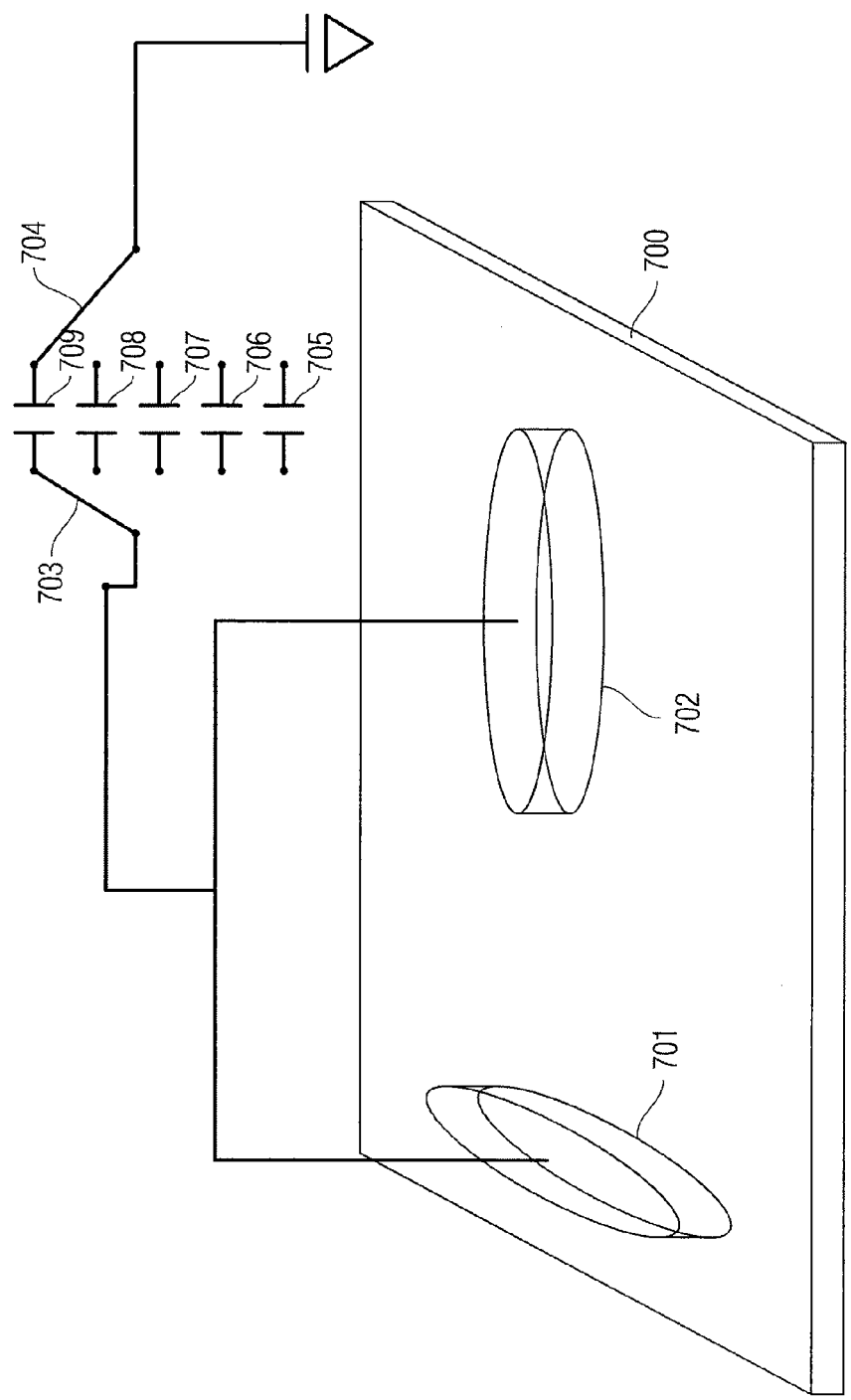
FIG. 7 is a diagram illustrating an exemplary experimental setup for measuring the relationship between calculated and actual $C_{GND}$ values.

FIG. 7 shows an exemplary experimental setup for measuring the relationship between calculated and actual $C_{GND}$ values. A multi-touch panel 700 for which the measurement is performed may be provided. Two elliptical brass electrodes 701 and 702 may be placed on the panel in order to simulate fingers touching the panel. Several capacitors 706-709 having different capacitances can be provided. Switches 703 and 704 can selectively connect the electrodes 701 and 702 to ground through one of the capacitors or a direct connection 705. Multiple connections to different capacitors can be sequentially made. For each connection, a device including the panel 700 (or another device) can calculate the optimal calculated $C_{GND}$ according to the method discussed above. The actual $C_{GND}$ can be the capacitance of the capacitor that is currently connecting the two electrodes to ground. The direct connection 705 can indicate an actual $C_{GND}$ of infinity. Thus, the experiment can obtain pairs of actual $C_{GND}$ values and respective calculated optimal $C_{GND}$ values. These pairs of values can be reflected as points in the graph of FIG. 6. The rest of the graph can be formed by curve fitting the existing experimentally obtained points.

Once the actual $C_{GND}$ value is obtained, it can be used to calculate the correct or parasitic capacitance compensated capacitance values for the touch panel (i.e., the values for the matrix C) by entering the actual $C_{GND}$ value in Equation (8).

The above discussed process includes two iterations or, in other words two nested loops. First, Equation (8) can be iterated to be solved. Secondly, multiple $C_{GND}$ values may need to be tried in order to determine the optimal and actual $C_{GND}$ values. As discussed above, each time a $C_{GND}$ value is tried, Equation (8) may need to be re-iterated.

This use of nested iterations may require relatively high computational power. It is noted that the $C_{GND}$ of a device may change periodically, as a user of the device moves (thus changing the body capacitance $C_{BODY}$) or the user moves the device (thus changing the chassis capacitance $C_{CHASSI}$). Therefore, the above discussed nested loop calculation of $C_{GND}$ may need to be performed periodically in order to ensure that a reasonably current and correct $C_{GND}$ is being used.

Some types of devices may have the processing power to perform the above discussed calculations in the desired periodicity. This may allow these types of devices to perform high precision stray capacitance compensation calculations and to obtain very accurate capacitance values for the matrix C. However, other types of devices may have limited processing power. These devices may not be able to perform the above discussed calculations with the desired frequency.

Therefore, some embodiments may perform parasitic capacitance compensation by utilizing a process similar to the one discussed above but featuring several approximations and simplifications that are intended to reduce the calculation load of the above process. This may be referred to as the high efficiency method (or sets of methods). The higher computational cost methods discussed above can be referred to as the high precision method(s).

For example, instead of calculating an actual $C_{GND}$ value, the high efficiency method can use a single predefined $C_{GND}$ value. The predefined $C_{GND}$ value can be obtained by performing experimentation with the type of device for which the $C_{GND}$ values are being used. More specifically, the $C_{GND}$ capacitances of various expected ordinary used of the device can be experimentally obtained. This can include experiments of placing the device on different surfaces (to vary the chassis capacitance) and experimenting with different users, wear different clothes and shoes as well as walking on different types of surfaces (to vary the body capacitance). After experimentation obtains different $C_{GND}$ values for different usage scenarios, a single predefined $C_{GND}$ value may be obtained based on these values. The single value can be selected to be close to all or most experimentally obtained values so that it does not present a too high level of error from any experimental values for likely usage scenarios. The predefined value can be, for example, an average of the experimentally obtained values.

The predefined $C_{GND}$ value can be used to calculate a stray capacitance compensated set of capacitances for the panel (i.e., matrix C). However, since the predefined value includes a certain error level, Equation (8) for calculating matrix C can be changed to an equation that has a lower error over the likely usage scenarios. The following equation can be used:

$$\text{matrix of CSIG\_SENSE}_{actual} = C_{k+1} = C' + r \cdot A \frac{C_k Q C_k}{v^T C_k u + C_G} \quad (13)$$

Parameter r can be a relaxation factor, or a multiple used to reduce the size of possible errors. One exemplary value of r is 0.75. If the above equation is used, then the value of $C_{GND}$ can be slightly increased to compensate for the relaxation factor r. Since the norm of the gradient of (13) is less than one for r<1, the contraction mapping theorem assures convergence from any initial image, C1.

A limited number of iterations of Equation (13) can be performed before obtaining a final result for the matrix C. For example, in some embodiments, only 3 iterations can be performed. This will conserve processing time. However, this may result in a matrix that is not quite accurate. For example, the resulting matrix may properly compensate for stray capacitance at certain portions of the touch panel, but may introduce additional errors and artifacts at those or other portions.

For that reason, embodiments of the invention need not actually use the compensated matrix resulting from Equation (13) to replace the matrix of the originally sensed capacitance values C'. Instead, embodiments, can use the matrix of original matrix for most occasions, but examine the original matrix for artifacts that may be the result of stray capacitance and may cause incorrect results.

A matrix of sensed capacitances includes capacitance values of individual pixels. Each capacitance value at a pixel may indicate whether that pixel is being touched. Therefore, the matrix may define a "touch image" of sorts indicating the touch status of each pixel. However, such a matrix represents a lot of information for higher level modules. Higher level modules may be various software and/or hardware that are end users of touch data, such as applications using touch data to interface with a user, and/or various operating system modules used for the same purpose. Many higher level modules cannot handle processing such a matrix every cycle in order to detect user input. Therefore, the matrix can be simplified by larger areas that have been touched and replacing them with software objects (or patches) that indicate certain properties of the touched areas but need not hold information defining the state of each touch pixel. This process is referred to segmentation and is described in more detail in U.S. patent application Ser. No. 11/818,475, filed on Jun. 13, 2007, entitled "BOTTOM UP WATERSHED DATAFLOW METHOD AND REGION SPECIFIC SEGMENT BASED ON HISTORIC DATA" and incorporated herein by reference in its entirety for all purposes.

Figure 8:
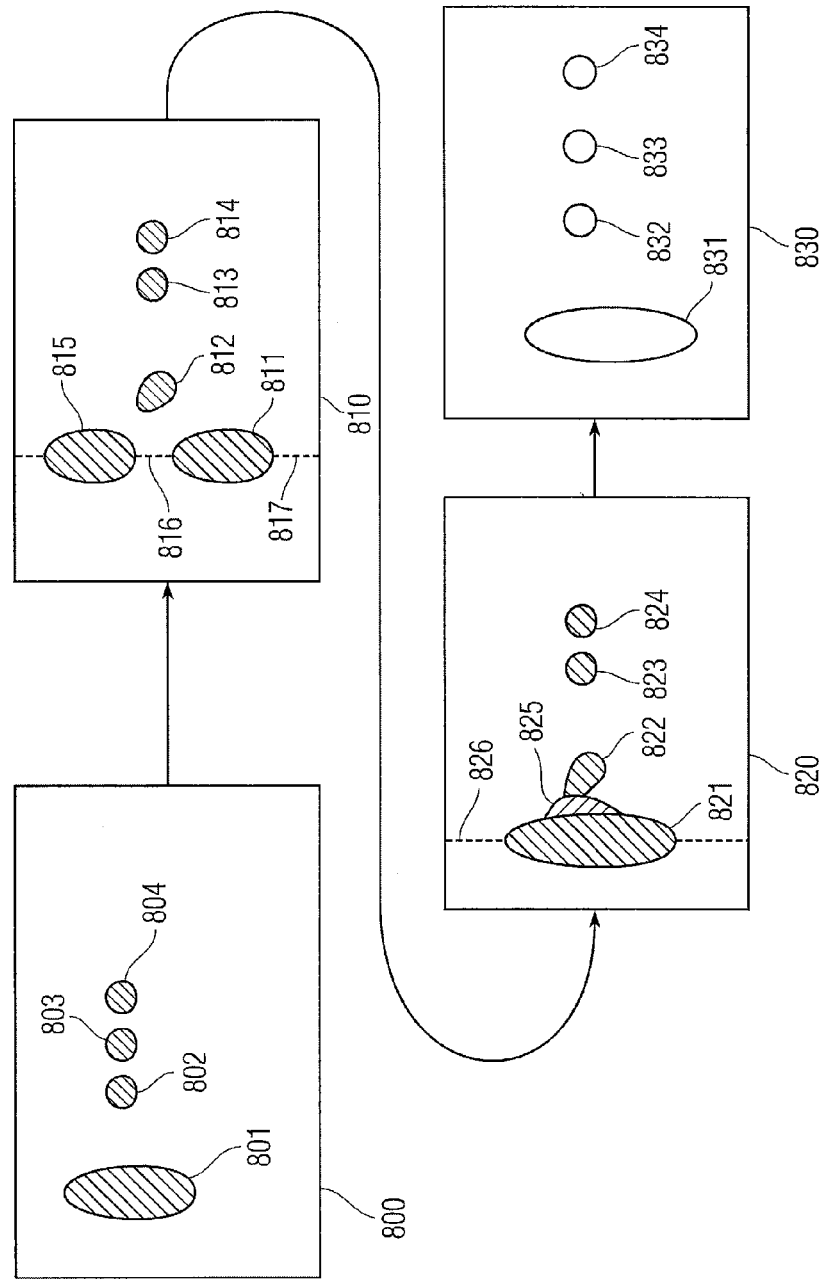
FIG. 8 is a diagram showing object based negative pixel compensation according to some embodiments of the invention.

Referring to FIG. 8, element 800 is an exemplary touch image. The shaded areas indicate pixels that are sensing a touch (i.e., pixels with lower capacitances). Thus, several regions 801-804 are being touched. This image may result from a user placing on the panel the side of the thumb and the tips of three fingers of the user's right hand. The touch image may be segmented into several objects, which may represent regions 801-804. These objects may approximately define the shape position and orientation of the portions. For example, the object for region 801 can be defined as an ellipse, and the objects for regions 802-804 as circles, even if the regions are not exactly of these shapes.

According to the original high precision method, compensation for parasitic capacitance can be performed before segmentation, so that after segmentation it can be relatively certain that the regions that are being converted into objects accurately represent actual touches. According to the high efficiency method, segmentation can be performed before or at the same time as parasitic capacitance compensation. Thus segmentation can be performed on an image received from the touch panel that has not been compensated for parasitic capacitance.

After segmentation, the device can check the resulting objects and determine whether there is a suspicious combination of objects there. A suspicious combination is a combination which may result from commonly observed errors due to parasitic capacitance. Nevertheless, it is not certain whether the suspicious combination is the result of an error or merely a correct sensing of an actual finger placement that looks like a commonly encountered erroneous reading. In some embodiments suspicious combinations can be detected by examining objects after segmentation (as described above), and the originally sensed touch and compensated images.

Image 810 is an example of a suspicious combination. Image 810 includes regions 811-815. This image may be correct. However, an image like image 810 is often the result of errors associated with stray capacitance. More specifically, image 810 can result when the actual correct touch configuration is the one shown by image 800. Stray capacitance from touch regions 802-804 may increase the sensed capacitance in the middle of region 801 (or area 816 of image 810), thus making this area seem like it has not been touched. Thus, stray capacitance, can make the touch configuration shown in image 800, be detected as image 810. In general, an image can be considered suspicious if it includes a plurality of small regions (such as regions 812-814) positioned in a straight line and two larger regions (such as regions 815 and 816) positioned in proximity to each other, such that the straight line along which the small regions are positioned goes through an empty space between the two larger regions.

According to embodiments of the invention, if a suspicious image such as image 810 is detected, the device can check whether the suspicious image is indeed an erroneous image by performing stray capacitance compensation according to the efficient stray capacitance compensation method discussed above (i.e., by evaluating Equation (13)). In some embodiments, the efficient stray capacitance compensation method is performed on all images, whether suspicious or not, but it may only be used when an image is found to be suspicious.

To determine whether objects in the segmented image form a suspicious combination, all pairs of adjacent objects are examined. The examination can include two stages all objects being examined in the first stage to select a set of objects that may be suspicious objects, and the selected set is examined in a second stage to determine which if any of them are actually suspicious. This limits corrections to areas of the image where adverse effects from stray capacitance are most likely. In the present example, corrections are only applied to the area around region 821. This ensures that random artifacts of the efficient compensated image are ignored.

A first set of rules used in the first stage determines whether a pair of adjacent objects is likely to be a thumb split into two disjoint regions by stray capacitance. To "pass" the first stage, a pair of objects must satisfy Equations (14) and (15) below. To satisfy Equation (14), the objects must be such that their combined area exceeds a minimum threshold which is derived from the expected area of a thumb reduced by the worst case reduction that can be caused by stray capacitance, $$\text{area(object1)+area(object2)} > \text{predefinedthreshold} \cdot \text{reductionfactor} \quad (14)$$

To calculate Equation (15), a bounding box of the pair of objects can be measured. The bounding box can be the smallest rectangle that includes the entirety of both objects. To satisfy Equation (15), the bounding box of the object pair should remain thumb-sized, or narrower than a predefined threshold set slightly higher than a finger diameter. Thus, for an object pair including objects i and j, Equation (15) may be as follows:

$$\text{diameter(boundingBox}(i,j)) > \text{predefinedthreshold}, \quad (15)$$

where the diameter of a bounding box can be defined as $$\text{diameter} = \sqrt{(\max\_x - \min\_x)^2 + (\max\_y - \min\_y)^2} \quad (16)$$

where min_x and max_x are respectively the minimum and maximum x coordinates of the bounding box and min_y and max_y are the respectively the minimum and maximum y coordinates of the bounding box.

The second set of rules is applied only to objects that pass the first set of rules (i.e., Equations 14 and 15, above). The second set of rules can be used to identify and exclude pairs of objects which are likely to be a combination of a part of a palm and a finger. Such pairs are correctly identified as two different objects and not as a single object that is erroneously split by the effects of stray capacitance. Therefore, such pairs can be excluded from the later stage of error checking and compensation for stray capacitance. This may prevent artifacts resulting from the approximations associated with the high efficiency method for compensating for stray capacitance. For example, compensation image 820 may include artifact 825, which is what appears to be a touch region but did not result from a touch. This phantom touch region would otherwise induce merging of the two objects in the later stage of error checking if the compensated image were used. Thus the second stage excludes all pairs of objects i and j which satisfy:

$$\begin{bmatrix} \text{area}(i) \geq \text{predefined } threshold1 \text{ AND} \\ \text{diameter}(boundingBox(i)) \geq \text{predefined } threshold2 \\ \text{AND} \\ \text{area}(j) < \text{predefined } threshold3 \text{ AND} \\ \text{diameter}(boundingBox(j)) < \text{predefined } threshold4 \end{bmatrix} \text{ OR} \quad (17)$$

$$\begin{bmatrix} \text{area}(j) \geq \text{predefined } threshold1 \text{ AND} \\ \text{diameter}(boundingBox(j)) \geq \text{predefined } threshold2 \\ \text{AND} \\ \text{area}(i) < \text{predefined } threshold3 \text{ AND} \\ \text{diameter}(boundingBox(i) < \text{predefined } threshold4 \end{bmatrix}$$

where the predefined thresholds are related to the areas and diameters of nominal palm fragments and finger contacts diminished by the worst case reduction in area and diameter caused by stray capacitance, the bounding box of an object is the smallest rectangle that includes the entire object and the diameter of a bounding box is defined in Equation (16). Again, pairs of objects that pass Equation (17) are excluded from further checking. Thus, a pair of objects may be considered suspicious if the pair passes Equations (14) and (15) but does not pass Equation (17). If a pair of objects is suspicious, than the area these objects take up and the area around them can also be considered suspicious.

In some embodiments, the matrix resulting from the stray capacitance compensation is checked to determine whether the area around at the suspicious regions (e.g., regions 811, 815 and 816) changes as a result of the compensation. If this area changes to a single region, such as region 801 of image 800, then it can be concluded that the image 810 was in fact an error and regions 811 and 816 should be a single region. If, however, the separation between regions 811 and 815 persists even after the compensation, then it can be concluded that there is no significant error, and the original image 810 was in fact a correct image.

In other embodiments a related but more complex method is used to determine whether a pair of suspicious regions should be combined or remerged into a single region. This method is described with reference to FIG. 9 below.

Figure 9:
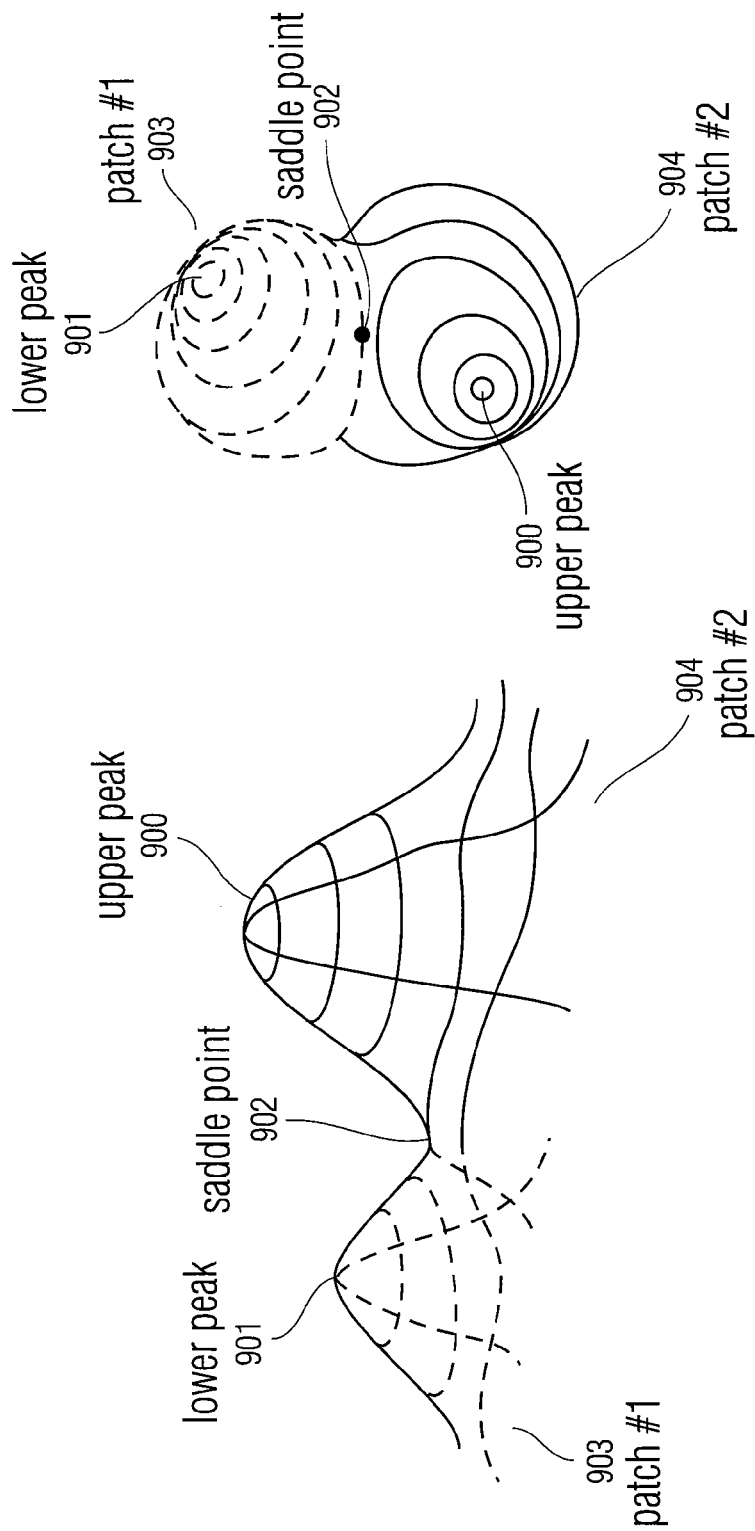
FIG. 9 is a diagram showing erroneous object determination according to some embodiments of the invention.

FIG. 9 shows an exemplary three-dimensional graph used to determine if a pair of patches 903 and 904 in a segmented non-compensated image need to be remerged into a single patch. Patches 903 and 904 can correspond to regions 811 and 815 of image 810. Raster data associated with patches 903 and 904 is represented in the three-dimensional graph of FIG. 9 by using the height dimension of the graph to represent the strength of a touch signal at each particular point in a region associated with the patch. In some embodiments, the strength of a touch signal can be indicated by a lower sensed capacitance. Thus, the height of the graph may indicate a decrease of sensed capacitance from a predefined rest capacitance (the rest capacitance indicating the absence of a touch event).

Saddle_point 902 may be defined as the maximum height of the boundary between patches 903 and 904. Lower_peak 901 may be defined as the smallest maximum of patch 903 and patch 904, and upper peak 900 as the largest maximum of the two patches. The patches may be considered erroneous and subject to merging if:

$$(\text{saddle\_point})/(\text{lower\_peak}) > \text{predefined\_threshold} \quad (17)$$

This may indicate that there is a gradual transition, which may in turn be an indication of a single touch region. While the non-compensated image 810 can be used to provide the raster data associated with patches 903 and 904 shown in FIG. 9, the compensated image 820 can be used as the source of the saddle and lower peak magnitudes.

Image 820 is an exemplary image that may be obtained from the stray capacitance compensation. Image 820 shows a single region 821 where there previously were two regions 811 and 815. Therefore, compensation image 820 may indicate that image 810 was in fact erroneous according to the simpler method discussed above. Also, since image 820 includes a single region 821, it is likely to feature a relatively high saddle point and thus indicate that image 810 was erroneous according to the more complex method as well.

It should be noted that this may cause the determination of whether image 810 was erroneous to be itself erroneous. Thus, regions 821 and 822 may be merged into a single touch region not because that is the correct representation, but because an artifact appeared in the neighborhood of area 816. Nevertheless with the rule-based selection of suspicious regions and the optimal tuning of $C_G$ and r parameters to limit the strength of phantom touches over likely usage scenarios, this eventuality may be considered to be sufficiently unlikely to be ignored for the sake of efficiency.

Segmentation of image 810 which includes five objects corresponding to regions 811-815 can be performed. In some embodiments, this segmentation may be performed before the determination of whether there was an error.

Higher level modules can use the non-compensated image 810, and a corrected segmentation of the non-compensated image 810. The segmentation of image 810 is corrected using compensated image 820 by using rule-based methods discussed above which select regions of the image which are most likely to be impacted adversely by stray capacitance. Corrections can be applied to very limited areas of the image. In the present example, corrections are only applied to the area around region 821. Again, this ensures that random artifacts of the compensated image are ignored.

The result of the above discussed process can be patches 831-834 shown in segmented image 830. Unlike images 800, 810 and 820, segmented image 830 does not represent rasterized data, but instead represents a set of discrete two dimensional patches 831-834 that refer to the properties of geometric shapes. Thus, patches 831-834 can be defined as geometric shapes and their various attributes, instead of by rasterized data. For example, object 832 can be defined as a patch which has a best-fit ellipse, its radii and the coordinates of its center. If an actual rasterized touch image is needed, image 810 can be used. Patches 831-834 can be derived through pixel weighted measurements which are measurements that take in raw pixel data and fit them to more easily defined patches (such as patches 831-834) which can be processed more easily by applications and various other higher level modules that use touch data.

Once it is determined that an image, such as image 810, is suspicious, this image is examined closer to determine whether it is actually erroneous and thus requires correction. More specifically, a pair of large patches, such as patches 811 and 815 of image 810, can be examined more closely to determine whether they are the have been erroneously separated into two different patches by the effects of stray capacitance.

Figure 10:
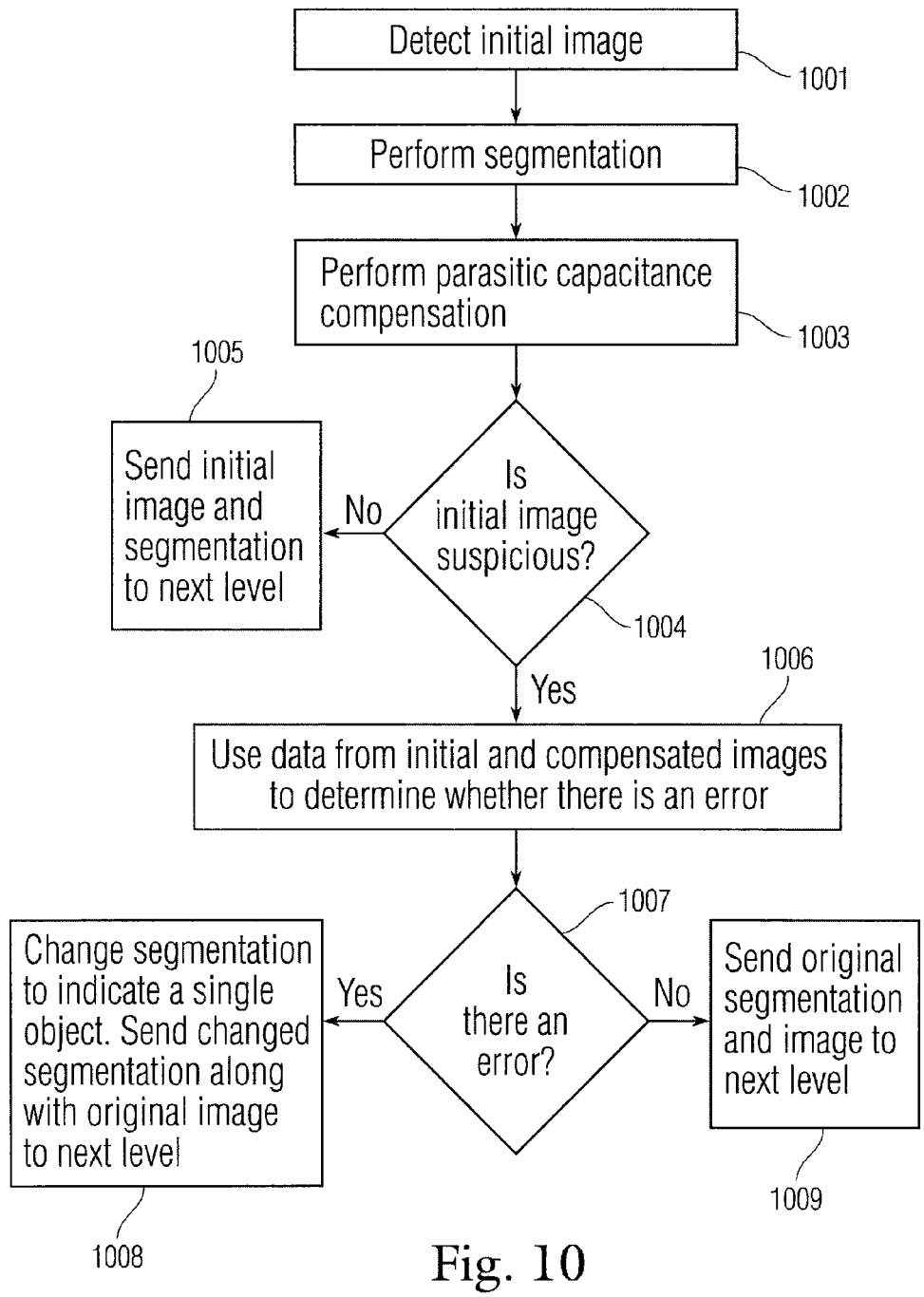
FIG. 10 is a flowchart showing an efficient method for negative pixel compensation according to some embodiments of the invention.

FIG. 10 is a flow chart showing the efficient parasitic capacitance compensation scheme discussed above. At step 1001, an initial touch image can be detected. The initial image may be an image received directly from the touch panel, or it may have had some initial filtering performed on it. At step 1002 segmentation can be performed to convert the touch regions of the initial image into various patches. The segmentation may be a specific type of initial segmentation referred to watershed segmentation.

At step 1003, parasitic capacitance compensation may be performed to obtain a compensated image. This can be done according to the efficient method discussed above (i.e., by Equation (13)). At step 1004, it is determined whether the initial image has any suspicious regions. More specifically, it is determined whether the initial segmented image includes any portions that fall within a pattern that indicates a likely parasitic capacitance related error. For example, it can be determined whether the initial image or portion thereof falls within the split-region pattern shown in image 810 in FIG. 8 which consists of closely neighboring patches of sufficient combined area and diameter. The determination of step 1004 can be performed based on the touch objects resulting from the segmentation of the initial image. If the initial image is not suspicious, there is no need for compensation and the initial image and the segmentation are sent to the next level, or the next module.

If the image is suspicious, the process discussed above in connection with FIG. 9 can be performed to determine whether there is an error (step 1006). More specifically, in step 1006, pairs of suspicious patches in the segmentation performed in step 1002 can be examined to determine whether they are erroneous and may need to be remerged. The examination may be performed based on raster data of the initially detected image of step 1001 and compensated data from the compensated image obtained in step 1006. Step 1007 splits the process depending on whether there is an error.

If there is an error detected (step 1008), then the segmentation is changed to reflect a single object instead of two objects reflected in the original segmentation. Thus, for example, with reference to FIG. 8, the original segmentation may have created two objects for regions 811 and 815 and the changed segmentation may create a single object 831 for these two regions. The changed segmentation is then sent to the next level or module along with the original image. Again, in some embodiments, the original image need not be combined and can still reflect two objects. It should be noted that in some embodiments, the compensated data obtained in step 1003 is not sent to higher level modules even if there is an error detected. In these embodiments, the compensated data can be used only to determine if there is an error (i.e., for step 1006) and is not used to define touch patches at all. These embodiments may use the compensated data in a very limited way because it may contain too much noise itself, having been obtained by the heavily approximated efficient method discussed above.

If there is no error detected, the original segmentation and image are sent to the next level or module (step 1009).

Figure 11:
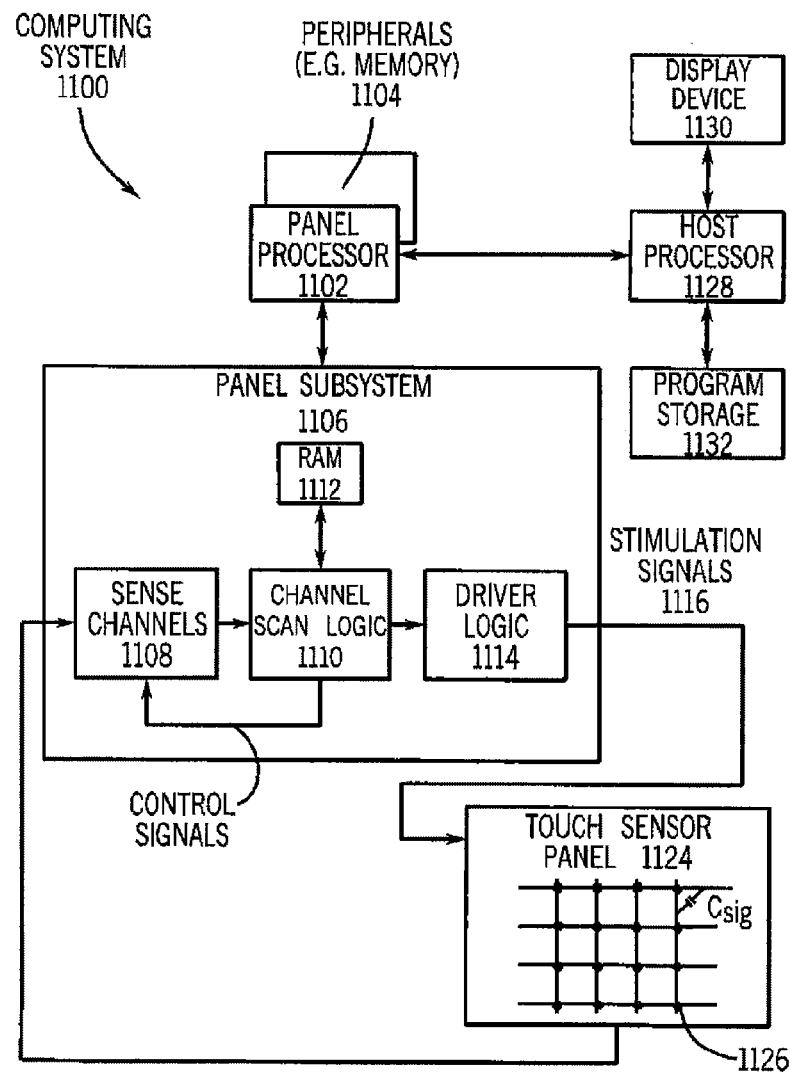
FIG. 11 illustrates an exemplary computing system that can include one or more of the embodiments of the invention.

FIG. 11 illustrates exemplary computing system 1100 that can include one or more of the embodiments of the invention described above. Computing system 1100 can include one or more panel processors 1102 and peripherals 1104, and panel subsystem 1106. Peripherals 1104 can include, but are not limited to, random access memory (RAM) or other types of memory or storage, watchdog timers and the like. Panel subsystem 1106 can include, but is not limited to, one or more sense channels 1108, channel scan logic 1110 and driver logic 1114. Channel scan logic 1110 can access RAM 1112, autonomously read data from the sense channels and provide control for the sense channels. In addition, channel scan logic 1110 can control driver logic 1114 to generate stimulation signals 1116 at various frequencies and phases that can be selectively applied to drive lines of touch sensor panel 1124. Channel scan logic 1110 can also control driver logic 1114 to generate reverse stimulation signals at various frequencies and phases that can be selectively applied to sense lines of the touch sensor panel 1124. Alternatively, separate channel scan logic and/or separate control drive logic may be provided within the panel subsystem 1106 to provided desired stimulation signals to the sense lines. In some embodiments, panel subsystem 1106, panel processor 1102 and peripherals 1104 can be integrated into a single application specific integrated circuit (ASIC).

Touch sensor panel 1124 can include a capacitive sensing medium having a plurality of drive lines and a plurality of sense lines, although other sensing media can also be used. Either or both of the drive and sense lines can be coupled to improved reliability conductive traces according to embodiments of the invention. Each intersection of drive and sense lines can represent a capacitive sensing node and can be viewed as picture element (pixel) 1126, which can be particularly useful when touch sensor panel 1124 is viewed as capturing an "image" of touch. (In other words, after panel subsystem 1106 has determined whether a touch event has been detected at each touch sensor in the touch sensor panel and panel processor 1102 has performed negative pixel compensation, the pattern of touch sensors in the multi-touch panel at which a touch event occurred can be viewed as an "image" of touch (e.g. a pattern of fingers touching the panel).) Each sense line of touch sensor panel 1124 can drive sense channel 1108 (also referred to herein as an event detection and demodulation circuit) in panel subsystem 1106.

Computing system 1100 can also include host processor 1128 for receiving outputs from panel processor 1102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1128 can also perform additional functions that may not be related to panel processing, and can be coupled to program storage 1132 and display device 1130 such as an LCD display for providing a UI to a user of the device. Display device 1130 together with touch sensor panel 1124, when located partially or entirely under the touch sensor panel, can form a touch screen.

Note that one or more of the functions described above can be performed by firmware stored in memory (e.g. one of the peripherals 1104 in FIG. 11) and executed by panel processor 1102, or stored in program storage 1132 and executed by host processor 1128. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 12A:
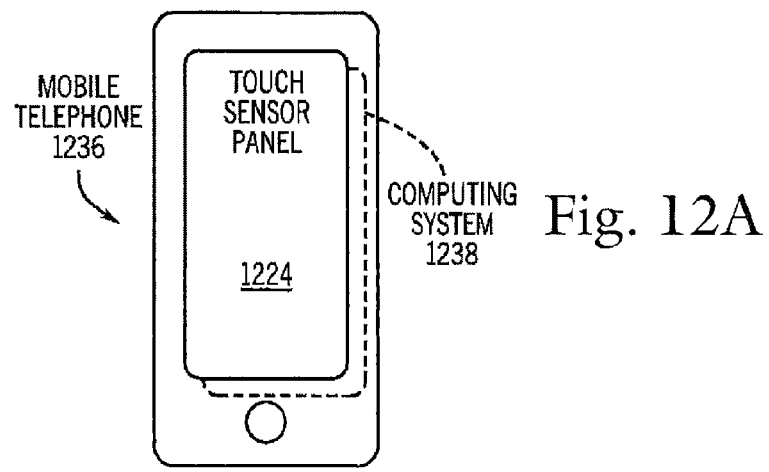
FIG. 12A illustrates exemplary mobile telephone that can include the computing system shown in FIG. 11 in accordance with embodiments of the invention.

FIG. 12A illustrates exemplary mobile telephone 1236 that can include computing system 1238 similar to computing system 1100. Mobile telephone 1236 can include touch sensor panel 1224 and associated processing capabilities (such as panel processor 1102 and panel subsystem 1106) in order to dynamically and selectively provide negative pixel compensation according to embodiments of the invention.

Figure 12B:
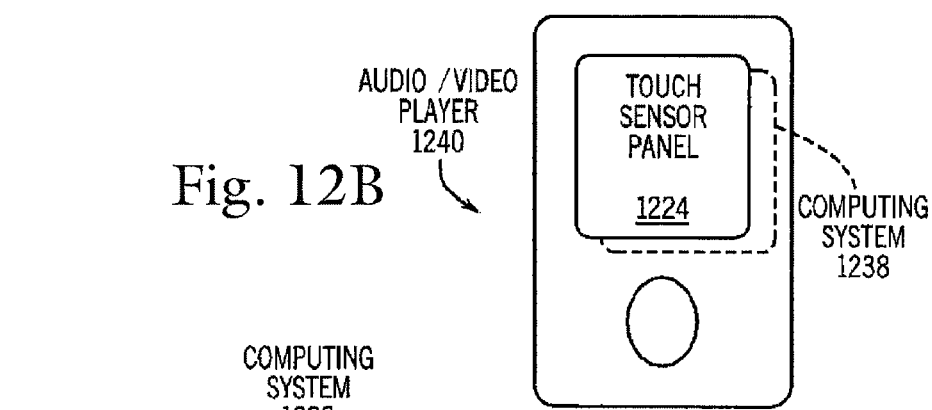
FIG. 12B illustrates exemplary digital media player that can include the computing system shown in FIG. 11 in accordance with embodiments of the invention.

FIG. 12B illustrates exemplary audio/video player 1240 (or a digital media player) that can include computing system 1238 similar to computing system 1100. Audio/video player 1240 can include touch sensor panel 1224 and associated processing capabilities (such as panel processor 1102 and panel subsystem 1106) in order to dynamically and selectively provide negative pixel compensation according to embodiments of the invention.

Figure 12C:
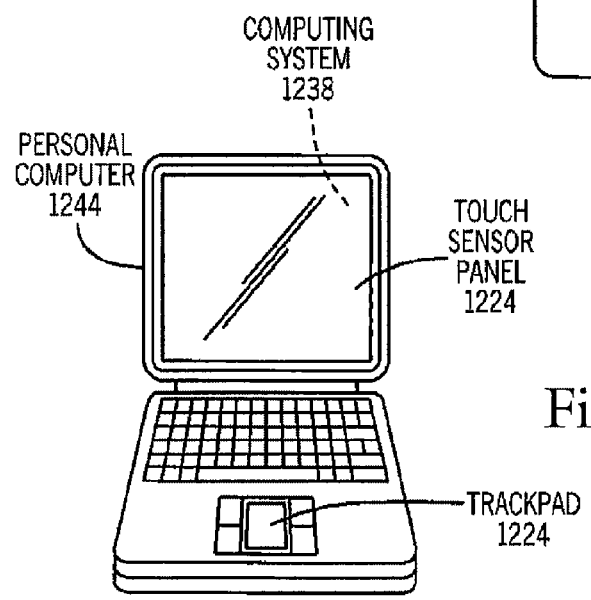
FIG. 12C illustrates exemplary personal computer that can include the computing system shown in FIG. 11 in accordance with embodiments of the invention.

FIG. 12C illustrates exemplary computer 1244 that can include computing system 1238 similar to computing system 1100. Computer 1244 can include touch sensor panel 1224 (included in a display and/or a trackpad) and associated processing capabilities (such as panel processor 1102 and panel subsystem 1106) in order to dynamically and selectively provide negative pixel compensation according to embodiments of the invention. The touch sensor panel 1224 may comprise, but is not limited to, at least one of a touch screen, a trackpad, and any other touch input surface device.

The mobile telephone, media player, and computer of FIGS. 12A-12C can achieve improved accuracy in detection of touch event(s) by utilizing the parasitic capacitance compensation scheme according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for compensating for negative pixel effects on a touch sensor panel of a device, including:
    measuring a plurality of pixel touch values;
    determining an object-to-ground capacitance associated with the device and an object in contact with the touch sensor panel, wherein the determining of the object to ground capacitance includes:
        providing an initial value for the object-to-ground capacitance;
        determining a plurality of corrected pixel touch values based on the initial value for the object-to-ground capacitance;
        re-determining the plurality of corrected pixel touch value with one or more new values for the object-to-ground capacitance to identify a final object to ground capacitance; and
    determining a plurality of corrected pixel touch values for respective pixels of the touch sensor panel based on the final object-to-ground capacitance and measured pixel touch values.

2. The method of claim 1, wherein determining the object-to-ground capacitance includes periodically determining the object-to-ground capacitance during normal sensing operation of the touch sensor panel.

3. The method of claim 1, wherein determining the plurality of corrected pixel touch values includes solving a generalized Sylvester equation.

4. The method of claim 3, wherein the solving of the generalized Sylvester equation includes solving the equation by iteration.

5. The method of claim 1, wherein the initial object-to-ground capacitance value is predefined at the device.

6. The method of claim 1, wherein the accuracy checking includes calculating an error value associated with the object-to-ground capacitance value being used during a particular iteration of the accuracy checking and comparing the error value to a predefined error threshold.

7. The method of claim 6, wherein the error value is based on negative values of the plurality of corrected pixel touch values.

8. The method of claim 6, further including providing a graph of the correlation of object-to-ground capacitance values and expected error values, wherein the new values for the object-to-ground capacitance are obtained based on the graph.

9. The method of claim 8, wherein the new values for the object-to-ground capacitance are obtained based on curve fitting object-to-ground capacitance values that have been tried in previous iterations of re-calculating the plurality of corrected pixel touch values and checking the accuracy of the re-calculation and their respective error rates to the graph.

10. A method for compensating for negative pixel effects on a touch sensor panel of a device, including:
    measuring a plurality of pixel touch values;
    determining an object-to-ground capacitance associated with the device and an object in contact with the touch sensor panel, wherein the determining of the object to ground capacitance includes:
        providing an initial value for the object-to-ground capacitance;
        determining a plurality of corrected pixel touch values based on the initial value for the object-to-ground capacitance;
        re-determining the plurality of corrected pixel touch value with one or more new values for the object-to-ground capacitance to identify a final object to ground capacitance; and
    determining a plurality of corrected pixel touch values for respective pixels of the touch sensor panel based on the final object-to-ground capacitance and measured pixel touch values;
    examining the plurality of measured pixel touch values for patterns that are known to result from errors due to negative pixel effects; and
    using the corrected pixel touch values to determine touch events only if the patterns known to result from errors are found.

11. The method of claim 10, wherein the determined object-to-ground capacitance is predefined at the device and is obtained based on experimentation.

12. The method of claim 10, wherein determining the plurality of corrected pixel touch values includes solving a generalized Sylvester equation.

13. The method of claim 12, wherein the solving of the generalized Sylvester equation includes solving the equation by iteration.

14. The method of claim 10, wherein the examining further includes: performing segmentation on the measured pixel touch values to obtain a plurality of touch patches; and checking the touch patches for any suspicious patterns that may be the result of negative pixels.

15. The method of claim 14, wherein the examining further includes:
    if the checking of the touch patches results in suspicious patterns, determining one or more suspicious areas associated with the suspicious patterns;
    using a subset of the measured pixel touch values and a subset of the corrected pixel touch values, both subsets being associated with the suspicious areas, to determine whether errors due to negative pixel effects have occurred.

16. The method of claim 15, wherein using the corrected pixel touch values to determine touch input includes:
   upon determination that errors due to negative pixel effects have occurred, correcting one or more objects of the plurality of touch patches, said one or more objects being in or in proximity to the suspicious areas, resulting in one or more corrected touch patches; and
   using the corrected touch patches to determine touch patches.

17. The method of claim 16, wherein the corrected pixel touch values are not used in pixel weighted measurements, other than their use to determine whether errors have occurred.

18. A non-transitory computer readable storage medium including a plurality of computer executable instructions, the instructions for causing a processor to perform a method for compensating for negative pixel effects on the touch sensor panel, the method comprising:
   measuring a plurality of pixel touch values;
   determining an object-to-ground capacitance associated with the device and an object in contact with the touch sensor panel, wherein the determining of the object to ground capacitance includes:
      providing an initial value for the object-to-ground capacitance;
      determining a plurality of corrected pixel touch values based on the initial value for the object-to-ground capacitance;
      re-determining the plurality of corrected pixel touch value with one or more new values for the object-to-ground capacitance to identify a final object to ground capacitance; and
   determining a plurality of corrected pixel touch values for respective pixels of the touch sensor panel based on the final object-to-ground capacitance and measured pixel touch values.

19. The non-transitory computer readable storage medium of claim 18, wherein determining the object-to-ground capacitance includes periodically selecting the object-to-ground capacitance during normal sensing operation of the touch sensor panel.

20. The non-transitory computer readable storage medium of claim 19, wherein the initial object-to-ground capacitance value is predefined at the device.

21. The non-transitory computer readable storage medium of claim 19, wherein the checking includes calculating an error value associated with the object-to-ground capacitance value being used during a particular iteration of the checking and comparing the error value to a predefined error threshold.

22. The non-transitory computer readable storage medium of claim 18, wherein determining the plurality of corrected pixel touch values includes solving a generalized Sylvester equation.

23. The non-transitory computer readable storage medium of claim 22, wherein the solving of the generalized Sylvester equation includes solving the equation by iteration.

24. A portable music player including a touch sensor panel, a processor and a non-transitory computer readable storage medium including a plurality of computer executable instructions, the instructions for causing a processor to perform a method for compensating for negative pixel effects on the touch sensor panel, the method comprising:
   measuring a plurality of measured pixel touch values;
   determining an object-to-ground capacitance associated with the device and an object in contact with the touch sensor panel, wherein the determining of the object to ground capacitance includes:
      providing an initial value for the object-to-ground capacitance;
      determining a plurality of corrected pixel touch values based on the initial value for the object-to-ground capacitance;
      re-determining the plurality of corrected pixel touch value with one or more new values for the object-to-ground capacitance to identify a final object to ground capacitance; and
   determining a plurality of corrected pixel touch values for respective pixels of the touch sensor panel based on the final object-to-ground capacitance and measured pixel touch values.

25. A mobile telephone including a touch sensor panel, a processor and a non-transitory computer readable storage medium including a plurality of computer executable instructions, the instructions for causing a processor to perform a method for compensating for negative pixel effects on the touch sensor panel, the method comprising:
   measuring a plurality of measured pixel touch values;
   determining an object-to-ground capacitance associated with the device and an object in contact with the touch sensor panel, wherein the determining of the object to ground capacitance includes:
      providing an initial value for the object-to-ground capacitance;
      determining a plurality of corrected pixel touch values based on the initial value for the object-to-ground capacitance;
      re-determining the plurality of corrected pixel touch value with one or more new values for the object-to-ground capacitance to identify a final object to ground capacitance; and
   determining a plurality of corrected pixel touch values for respective pixels of the touch sensor panel based on the final object-to-ground capacitance and measured pixel touch values.

26. A non-transitory computer readable storage medium including a plurality of computer executable instructions, the instructions for causing a processor to perform a method for compensating for negative pixel effects on the touch sensor panel, the method including:
   measuring a plurality of pixel touch values;
   determining an object-to-ground capacitance associated with the device and an object in contact with the touch sensor panel, wherein the determining of the object to ground capacitance includes:
      providing an initial value for the object-to-ground capacitance;
      determining a plurality of corrected pixel touch values based on the initial value for the object-to-ground capacitance;
      re-determining the plurality of corrected pixel touch value with one or more new values for the object-to-ground capacitance to identify a final object to ground capacitance; and
   determining a plurality of corrected pixel touch values for respective pixels of the touch sensor panel based on the final object-to-ground capacitance and measured pixel touch values;

examining the plurality of measured pixel touch values for patterns that are known to result from errors due to negative pixel effects; and using the corrected pixel touch values to determine touch events only if the patterns known to result from errors are found.

27. The non-transitory computer readable storage medium of claim 26, wherein the examining further includes:

performing segmentation on the measured pixel touch values to obtain a plurality of touch patches; and checking the touch patches for any patterns that may be the result of negative pixels.

28. The non-transitory computer readable storage medium of claim 27, wherein the examining further includes:

if the checking of the touch patches results in suspicious patterns, determining one or more suspicious areas associated with the suspicious patterns;

using a subset of the measured pixel touch values and a subset of the corrected pixel touch values, both subsets being associated with the suspicious areas, to determine whether errors due to negative pixel effects have occurred.

29. The non-transitory computer readable storage medium of claim 28, wherein using the corrected pixel touch values to determine touch input includes:

upon determination that errors due to negative pixel effects have occurred, correcting one or more objects of the plurality of touch patches, said one or more objects being in or in proximity to the suspicious areas, resulting in one or more corrected touch patches; and using the corrected touch patches to determine touch events.

30. The non-transitory computer readable storage medium of claim 29, wherein the corrected pixel touch values are not used in pixel weighted measurements, other than their use to determine whether errors have occurred.

31. A non-transitory computer readable medium comprising a plurality of computer executable instructions, the instructions being configured to cause a processor to perform a method for compensating for negative pixel effects on a touch sensor panel of a device, the method including:

measuring a plurality of measured pixel touch values;

determining an object-to-ground capacitance associated with the device and an object in contact with the touch sensor panel, wherein the determining of the object to ground capacitance includes:

providing an initial value for the object-to-ground capacitance;

determining a plurality of corrected pixel touch values based on the initial value for the object-to-ground capacitance;

re-determining the plurality of corrected pixel touch value with one or more new values for the object-to-ground capacitance to identify a final object to ground capacitance; and determining a plurality of corrected pixel touch values for respective pixels of the touch sensor panel based on the final object-to-ground capacitance and measured pixel touch values.

32. A non-transitory computer readable medium comprising a plurality of computer executable instructions, the instructions being configured to cause a processor to perform a method for compensating for negative pixel effects on a touch sensor panel of a device, the method including:

measuring a plurality of pixel touch values;

determining an object-to-ground capacitance associated with the device and an object in contact with the touch sensor panel, wherein the determining of the object to ground capacitance includes:

providing an initial value for the object-to-ground capacitance;

determining a plurality of corrected pixel touch values based on the initial value for the object-to-ground capacitance;

re-determining the plurality of corrected pixel touch value with one or more new values for the object-to-ground capacitance to identify a final object to ground capacitance; and determining a plurality of corrected pixel touch values for respective pixels of the touch sensor panel based on the final object-to-ground capacitance and measured pixel touch values;

examining the plurality of measured pixel touch values for patterns that are known to result from errors due to negative pixel effects; and using the corrected pixel touch values to determine touch events only if the patterns known to result from errors are found.

\* \* \* \* \*

UNITED STATES PATENT AND TRADEMARK OFFICE
CERTIFICATE OF CORRECTION

| | | |
|---|---|---|
| PATENT NO. | : 8,692,776 B2 | Page 1 of 1 |
| APPLICATION NO. | : 12/234520 | |
| DATED | : April 8, 2014 | |
| INVENTOR(S) | : Yousefpor et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1263 days.

Signed and Sealed this
Twenty-first Day of July, 2015

Michelle K. Lee
*Director of the United States Patent and Trademark Office*